(12) United States Patent
Benson

(10) Patent No.: US 6,301,660 B1
(45) Date of Patent: Oct. 9, 2001

(54) COMPUTER SYSTEM FOR PROTECTING A FILE AND A METHOD FOR PROTECTING A FILE

(75) Inventor: Glenn Benson, Munich (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/046,280

(22) Filed: Mar. 23, 1998

(30) Foreign Application Priority Data

Jul. 31, 1997 (EP) .................................................. 97113263

(51) Int. Cl.[7] ....................................................... G06F 11/30

(52) U.S. Cl. ........................... 713/165; 713/167; 380/280

(58) Field of Search .............................. 380/282; 705/57, 705/58; 713/165, 167

(56) References Cited

U.S. PATENT DOCUMENTS

| 5,638,446 |   | 6/1997  | Rubin . |        |
|-----------|---|---------|---------|--------|
| 5,673,316 | * | 9/1997  | Auerbach et al. | 705/51 |
| 5,765,152 | * | 6/1998  | Erickson | 707/9 |
| 5,809,144 | * | 9/1998  | Sirbu et al. | 705/53 |
| 5,887,060 | * | 3/1999  | Ronning | 705/52 |
| 5,903,647 | * | 5/1999  | Ronning | 705/57 |
| 5,905,798 | * | 5/1999  | Nerlikar et al. | 705/57 |
| 5,933,498 | * | 8/1999  | Schneck et al. | 705/54 |
| 5,935,246 | * | 8/1999  | Benson | 713/200 |
| 5,956,034 | * | 9/1999  | Sachs et al. | 345/350 |
| 6,002,772 | * | 12/1999 | Saito | 705/58 |
| 6,044,469 | * | 3/2000  | Hortsmann | 713/201 |
| 6,047,242 | * | 4/2000  | Benson | 702/35 |
| 6,049,789 | * | 4/2000  | Frison et al. | 705/59 |

FOREIGN PATENT DOCUMENTS

| 0 665 486 | 8/1995 | (EP) . |
| WO 88/05941 | 8/1988 | (WO) . |

OTHER PUBLICATIONS

Marc A. Kaplan, Digital Signatures for Software: Technical Requirments and a Proposal, Apr. 15, 1996, IBM.*
Marc A. Kaplan, IBM Cryptolopes, SuperDistribution and Digital Rights Management, IBM.*
Peter M. Benton, Packaging Information for Superdistribution, 1996, IBM Research Magazine: Issue 3.*
Marc A. Kaplan, Digital Rights Enforcement and Management: SuperDistribution of Cryptolopes, IBM.*
Harn et al., "A Software Authentication System for Information Integrity", Computers & Security, vol. 11, No. 8, Dec. 1992, pp. 747–752.
Crytolope Container Technology, International Business Machines.
Menezes et al., Handbook of applied cryptography, CRC Press, Inc., ISBN 0–8493–8523–7, 1997.
Rivest, "The MD5 Message–Digest Algorithm", RFC 1321, Apr. 1992, pp. 1–18.
Davis et al., "Cryptographic Randomness from Air Turbulence in Disk Drives", Advances in Cryptology: Crypto '94, pp. 114–120.
The Art of Computer Programming, vol. 2, Seminumerical Algorithms, Addison–Wesley Publishing Co., Reading MA, $2^{nd}$ Edition, 1981, pp. 38–73.

(List continued on next page.)

Primary Examiner—Thomas R. Peeso
(74) Attorney, Agent, or Firm—Schiff Hardin & Waite

(57) ABSTRACT

A computer system is provided having a protection mechanism for protecting the contents of a file. The protection mechanism has at least one Viewer program, at least one challenge associated with the Viewer program and the file, and at least one response with private keying material that it can access. The challenge has no access to the private keying material. The response can prove that it has access to the private keying material by interacting with the challenge using an asymmetric cryptographic scheme. The challenge can instruct the Viewer program to avoid using some or all of the file's content unless the proof is successful.

25 Claims, 11 Drawing Sheets

OTHER PUBLICATIONS

ISO/IEC 9594–1, Information technology—Open Systems Interconnection—The Directory: Overview of concepts, models and services, International Organizat6ion for Standardization, 1995, pp. 1–20.

Brassil et al., "Electronic Marking and Identification Techniques to Discourage Document Copying", IEEE INFOCOM 94, pp. 1278–1287.

\* cited by examiner

FIG 14

| 96 | 0 | WP, 15 minutes public key xxx | Signature of hash (hash (96, WP...), 0) |
| 108 | 1 | SS, execution public key xxx | Signature of hash (hash (108, SS...), 1) |
| 42 | 2 | WP, 15 minutes public key xxx | Signature of hash (hash (42, WP...), 2) |
| 70328 | 3 | WP, 15 minutes public key xxx | Signature of hash (hash (70328, WP...), 3) |

COMPUTER SYSTEM FOR PROTECTING A FILE AND A METHOD FOR PROTECTING A FILE

BACKGROUND OF THE INVENTION

The present invention relates to mechanisms for protecting electronic documents (files) against unauthorized use, and, in particular, against unauthorized copying or printing.

An electronic document is an electronic information container. The information stored in the container may include, but is not limited to, characters, graphic images, moving pictures, sound, and animation.

It is quite difficult to protect against unauthorized leaks of information. Photocopy machines, facsimiles, and other technologies permit information that has been fixed on a paper medium to be easily copied and distributed. In the case of electronically stored information, computers can instantly construct a virtually unlimited number of identical copies of electronically stored information.

One object of the invention is to designate one or more people as authorized distributors. A further object of the invention is to designate one or more people as authorized customers with the following constraints:

i) The authorized distributor may designate itself or others as authorized customers.

ii) The authorized distributors may distribute an electronic document to one or more authorized customers.

iii) For each electronic document distributed to each authorized customer, the authorized distributor may assign one or more document handling rules. Example document handling rules are permitting read-only access or permitting read and print access.

iv) Authorized customers may not distribute documents unless they are also authorized distributors. It is possible that zero or more authorized customers are also authorized distributors.

Consider the situation described in FIG. 1. In FIG. 1, an authorized distributor 101 sends information 106 (electronic documents) to each of several authorized customers 102, 103, 104. The distributor 101 sends the information 106 in encrypted form to ensure that no unauthorized intruder can view the information while the information is in transit. Many of the customers, e.g., an authorized first customer 102 and an authorized second customer 103 use the documents 106 as intended. That is, the customers who use the document correctly do not forward the documents to others. However, some customers, e.g., an authorized third customer 104, may attempt to perform actions beyond his or her authorization. That is, the third customer 104 may attempt to forward the documents 106 to one or more unauthorized customers 105. The present invention prohibits the third customer 104 from forwarding the documents 106 to any unauthorized customer 105 unless the authorized third customer 104 is also an authorized distributor.

Some example requirements that a security mechanism may potentially satisfy are listed below:

The authorized customers should not be prohibited from making backups.

Only standard hardware and software assumptions should be made. For example, although hardware dongles provide copy protection services, many vendors do not wish to limit the sale of the software to the collection of customers who own or are willing to install a dongle.

When a customer legitimately obtains a document, the customer should be able to use the document on any machine regardless of ownership. The customer should optionally be able to authorize simultaneous usage of the document in multiple machines.

The distributor should be permitted to distribute an identical version of the document software to all authorized customers. This requirement permits the documents to be distributed through normal channels such as, for example, CD-ROMs, floppy disks, or network bulletin boards.

It should be excessively difficult and/or computationally infeasible for a potential pirate to circumvent the security mechanism.

The security mechanism should not disclose the customer's private keying material to the distributor, any program distributed or produced by the distributor, or any potential Trojan horse program. Though the primary functionality is to protect the document vendor and distributor, one must not do so at the expense of the customer.

The present invention complies with the example requirements by providing a special copy protected program called the Viewer program that displays the contents of the protected document (file). The term "display" is used liberally in order to include showing, audio-broadcasting, or printing. The present invention's security mechanism ensures that one cannot view the protected file without using the Viewer program. Furthermore, the Viewer program prohibits viewing by anyone other than an authorized user.

The present invention can be used for any file which is used via a program, independent from the content of the file.

The protection of such files is important in very different scenarios, some of them are explained below:

Micro Publishers:

A micro publisher is a home hobbyist or small business who is willing to experiment with Internet publishing. An example micro publisher is a photographer who takes pictures at a sporting event and then sells the pictures to a newspaper.

Legacy Electronic Publishers:

The Legacy electronic publishers publish electronic documents. An example legacy electronic publisher is a major encyclopedia company.

Copyright Enforcers and Direct Marketers:

Some organizations are more interested in preventing copyright infringement rather than generating revenue.

Advertisers:

Advertisers are filling to pay advertising fees when they are sure that the advertisement is, in fact, embedded in the file and cannot be changed without authorization.

Document Labelers:

A document labeler inserts a label on a document, e.g., company confidential. The document labeler also inserts a document handling rule. For example, no non-company employee is an authorized customer of any company confidential document.

In "*Cryptolope Container Technology*," by International Business Machines, Mar. 3, 1997 (available on World Wide Web at http://www. cryptolope.ibm.com/white.htm), an application layer cryptographic encapsulation mechanism is described.

The basic mechanism is as illustrated in FIG. 2. The mechanism initiates when a vendor 201 generates a file (e.g. a document with the content of a newspaper, magazine, music, etc.) and encrypts the file using a symmetric key K. The vendor encrypts the symmetric key using the vendor's public key 204. The vendor sends as shown at 202 both the encrypted document 203 and the encrypted symmetric key 204 to a customer 209. Subsequently, the customer 209 and the vendor 201 coordinate payment information. During this coordination, the customer 209 sends a purchase request which includes the encrypted symmetric key 205 (copied from the encrypted symmetric key 204) and a certificate containing the customer's public key 207. Next, the vendor 201 decrypts the symmetric key using the vendor's private key and then re-encrypts the symmetric key using the customer's public key 207 (obtained from the customer's certificate). The vendor 201 sends as shown at 210 the re-encrypted symmetric key 208 back to the customer 209. Using the customer's private key, the customer 209 decrypts the original file. All of the customer's functionality described above is performed by a special Viewer program.

In the above mentioned mechanism, the customer 209 must perform an asymmetric decryption operation to obtain a symmetric file encryption key K. The intent is that the customer 209 must have his or her asymmetric private key in order to perform the asymmetric decryption operation.

However, the above mentioned mechanism is vulnerable to attack, e.g. by the following attack scenario as illustrated in FIG. 3:

1. After completing the correctly authorized scenario of FIG. 2, an authorized customer 209 obtains an encrypted file 203. The file 203 is encrypted using the symmetric key K.
2. The encrypted symmetric key 208 is provided to the customer 209.
3. The customer's decryption mechanism, e.g., smart card, performs the decryption operation. The customer 209 saves the plain text symmetric key K.
4. If the customer 209 wishes to perform an unauthorized copy of the file, the customer 209 passes as shown at 314 the encrypted file 313 (copied from the encrypted file 203), the encrypted symmetric key 311 (copied from the encrypted symmetric key 208), and the plain text symmetric key K 312 to an authorized customer 315.
5. The unauthorized customer's Viewer program which uses the file, provided the encrypted symmetric key 311 to the unauthorized customer 315 (the Viewer program does not know that the customer 315 is not authorized).
6. The unauthorized customer's decryption mechanism fakes the decryption operation because the unauthorized customer 315 does not have the customer's private key. Instead, the unauthorized customer's decryption mechanism returns the plain text symmetric key 312 obtained in step 4. Since this is the correct symmetric key, the Viewer believes that the unauthorized customer knows how to perform the required decryption operation. As a result, the Viewer permits the unauthorized customer 315 to view or use the file.

As can be seen from this attack, the known mechanism does not prove that the customer 315 has the correct asymmetric private key. As a result, this mechanism does not protect against unauthorized document redistribution.

An overview on asymmetric cryptography, for example on the RSA scheme, and probabilistic encryption, for example the Blum-Goldwasser probabilistic public-key encryption scheme can be found in Menezes et al. supra.

An overview over different probabilistic proof schemes, for example zero knowledge proof schemes (e.g. Feige-Fiat-Shamir scheme, Guillou-Quisquater scheme, Blum-Feldmann-Micali scheme, Brassard scheme, Crepau scheme, etc.) or witness hiding proof schemes (e.g. Feige-Shamir scheme, etc.) can be found in Menezes et al. supra.

An overview of digital signature schemes (e.g. Rivest-Shamir-Adleman, etc.,) and a formal mathematical definition of digital signatures can be found in Menezes et al. supra.

An example of a message digest function (otherwise known as a one-way hash function) is MD5 (see R. Rivest, "The MD5 Message-Digest Algorithm, RFC 1321, April 1992). It is computationally infeasible or very difficult to compute the inverse of a message digest.

In P. Fenstermacher al., "Cryptographic Randomness From Air Turbulence in Disk Drives," Advances in Cryptology: Crypto '94, Springer Verlag, 1994, pp. 114–120, cryptographic randomness from air turbulence in disk drives is described.

The Chi-Square Test, the Kolmogorov-Smirnov Test, and the Serial Correlation Test are described in D. Knuth, "The Art of Computer Programming," Vol. 2, Seminumerical Algorithms, Reading, Mass.: Addison-Wesley Publishing Co., 1981, pp. 38–73.

An object of the present invention is to provide an improved mechanism to protect a file that is able to satisfy most, if not all, of the example requirements described above.

An asymmetric cryptographic mechanism includes public keying material and corresponding private keying material. It is computationally infeasible to compute the private keying material when given no more information other than the corresponding public keying material. In the present invention, asymmetric cryptography is used in interactions between two parties, A and B. A proves to B that A has access to private keying material, and B validates the proof. A does not disclose the private keying material to B.

Some important asymmetric cryptographic algorithms that may be used in the present invention are listed below. Asymmetric Confidentiality Scheme:

An asymmetric confidentiality protocol involves two parties, A and B. A possesses private keying material and B has no access to A's private keying material without disclosing the private keying material itself. At the beginning, A and B have no shared secret. During the method, a shared secret becomes known to A and B.

An example of an asymmetric confidentiality proof is public key encryption. As illustrated in the asymmetric confidentiality protocol below, A proves to B that A has access to the private keying material.

A ← B: $h(r), B, P_A(r,B)$

A → B: r

The protocol scheme described above uses the following notation:

A → B denotes that A sends a message to B; and A ← B denotes that B sends a message to A.

r denotes a random number used as a nonce $h(r)$ is a message digest of the nonce $P_A(r,B)$ is encryption of the nonce and B's identity using A's public keying material Here, B generates a nonce and encrypts the nonce (together with B's identity) using A's public keying material, i.e., $P_A(r,B)$.

Additionally B computes the message digest of the nonce, $h(r)$.

B sends the information described above, along with a value representing B's identity, to A.

Next, A uses its private keying material to decrypt $P_A(r,B)$ obtaining r,B. A computes the message digest of the decrypted random value, r, and compares the result against $h(r)$ obtained from B. At this point, the random number is a shared secret known by both A and B.

In order to complete the protocol, A returns the random number to B to demonstrate that A knows the secret. Of course, once A provides the disclosure, the secrecy of the random number is lost. B validates A's proof by checking for equality between A's returned secret against the one that B originally generated.

A second example of an asymmetric confidentiality protocol is a probabilistic encryption scheme, e.g. the Blum-Goldwasser probabilistic public key encryption scheme. Here, the encryption or decryption mechanism uses random numbers or other probabilistic means.

Digital Signature Scheme:

A digital signature is an electronic analog of a handwritten signature. A digital signature proof involves at least two parties, A and B. After posting his or her public keying material to a public location, A encrypts a message using the private keying material. Since anyone may access the public keying material, there is no message secrecy. However, since A is the only customer with access to the private keying material, no one else can "forge A's signature" by performing the encryption. Anyone may validate A's signature using the public keying material.

Probabilistic Proof Scheme

A probabilistic proof involves at least two parties, A and B. A possesses private keying material, and B has no access to A's private keying material without disclosing the private keying material itself. A's proof is probabilistic rather than absolute because B forces A to demonstrate that A probably has access to the private keying material by supplying evidence.

There are two variants of probabilistic proofs:

a) zero-knowledge-proofs, where it is provable, that B or any observer of the proof learns nothing from the proof, except the fact that A possesses the private keying material.

b) witness-challenge-response-proofs which comprise the following 4 elements in a sequence:
1. A sends information which is not constant for all invocations of the proof to B. This information is called the witness. For many protocols, the witness is generated randomly and should never be repeated.
2. B sends information to A called the challenge. For many protocols, the challenge is generated randomly.
3. A sends a response to B.
4. B verifies whether A indeed knows the private keying material by executing computations involving the witness, the challenge, and the response.

In fact, many zero-knowledge-proofs are witness-challenge-response-proofs.

Zero knowledge proof schemes are known, e.g. the Feige-Fiat-Shamir as taught in Menezes et al. supra scheme or the Guillou-Quisquater scheme also taught in A. Menezes et al., *Handbook of Applied Cryptography*, CRC Press, Inc. 1997, pp. 22–23, 224–233, 250–259, 308–311, 405–424, 433–438, 572–577, but also the Mono-directional zero knowledge proof schemes, e.g. the Blum-Feldmann-Macali scheme, or Statistical zero knowledge proof schemes, e.g. the Brassard scheme or the Crepau scheme, etc. Witness hiding proof schemes are also known, e.g. the Feiae-Shamir scheme, etc.

One should not confuse probabilistic public-key encryption (for the purpose of providing confidentiality) with probabilistic proofs. In the first case, probabilistic means are used to execute the encryption algorithm. In the second case, probabilistic means are used to define a degree of assurance for a service such as identification.

In the following, one possible general structure of a zero-knowledge protocol is described Menezes et al. supra. For illustrative purposes, this general structure is also of the witness-challenge-response-proof format.

The protocol involves two parties, A and B.
1. The prover claiming to be A selects a random element from a pre-defined set as its secret commitment (providing hidden randomization) and from this, computes an associated (public) witness. This provides initial randomness for variation from other protocol runs and defines a set of questions all of which the prover claims to be able to answer thereby a priori constraining his or her forthcoming response. Only the legitimate party A, with knowledge of A's secret, is truly capable of answering all of the questions, and the answer to any one of these questions provides no information about A's long-term secret.
2. B's subsequent challenge selects one of these questions.
3. A provides its response.
4. B checks the response for correctness.

The protocol may be iterated to improve the bound limiting the probability of successful cheating.

A digital watermark scheme discourages unauthorized document distribution by embedding in a document a unique identification symbol.

A chosen-plain text attack is one where the adversary chooses plain text and is then given corresponding ciphertext. Subsequently, the adversary uses any information deduced to recover plain text corresponding to previously unseen ciphertext (see Menezes et al., supra).

An adaptive chosen-plain text attack is a chosen-plain text attack wherein the choice of plain text may depend on the ciphertext received from previous results (see Menezes et al. supra).

A zero knowledge proof protocol resists both chosen-plain text attacks and adaptive chosen-plain text attacks.

In all asymmetric cryptographic schemes, each customer may post his or her public keying material to a publicly accessed directory without compromising the corresponding private keying material. The customer usually should guard his or her private keying material as a close secret; otherwise, the cryptographic system may not guarantee correctness (secrecy). The best known mechanism for protecting one's private keying material is through the use of a smart card. In this case, the smart card is a device with no interface for releasing private keying material (in a non-cryptographically protected form).

Although smart cards provide the best protection, social factors of electronic commerce may provide a role in ensuring private keying material protection. One of the significant difficulties associated with asymmetric encryption services is authentication. For example, if A posts his or her public keying material to a public directory, then how does B assess validity? That is, a pirate may attempt to masquerade as A but post the pirate's keying material. Some commercial organizations provide solutions to this problem by acting as Certification Authorities (CA). For (possibly) a fee, the CA solicits identifying material from potential customers such as a driver's license or passport. After validating the identifying material, the CA posts the customer's public keying material to a public directory, and the CA signs a certificate (using a digital signature with the CA's private key) that holds the customer's public keying material. Standardized services, for example X.500, may be adopted to help facilitate the use of directories that contain public keying material.

Once a customer posts his or her public keying material to the CA, the customer will probably make an extensive effort to protect his or her private keying material. For some asymmetric keys, if the customer's private keying material were to become unknowingly compromised, then the customer would have cause for significant concern. For example, in the case of RSA keys that can also be used for digital signatures, networked vendors may potentially authorize electronic commerce transactions.

An object of the present invention is to provide an improved mechanism that is able to satisfy most, if not all, of the example requirements described above.

SUMMARY OF THE INVENTION

According to the present invention, a computer system is provided having a protection mechanism for protecting the contents of a file. The protection mechanism has at least one Viewer program, at least one challenge means associated with the Viewer program and the file, and at least one response means with private keying material that it can access. The challenge means has no access to the private keying material. The response means has means for proving that it has access to the private keying material by interacting with the challenge means using an asymmetric cryptographic scheme. The challenge means has means for instructing the Viewer program to avoid displaying some or all of the file's content unless the proof is successful.

According to a further aspect of the present invention, a computer system is provided having a protection mechanism for protecting the contents of a file. The protection mechanism has at least one Viewer program, at least one challenge means associated with the Viewer program and the file, and a response means with private keying material that it can access. The challenge means has no access to the private keying material. The response means has means for proving that it has access to the private keying material by interacting with the challenge means using an asymmetric cryptographic scheme. The challenge means has means for prohibiting use of some or all the file's content unless the proof is successful.

According to a further aspect of the present invention, a computer system is provided having means for inputting a Viewer program which uses files to be protected and for embedding at least one challenge means in the Viewer program which uses the file. The challenge means has means for participating in an asymmetric cryptographic scheme wherein the challenge means has no access to a private keying material; means for validating that the challenge means possesses the private keying material; and means for instructing the Viewer program to avoid displaying some or all the file's content unless the proof is successful.

According to a further aspect of the present invention, a computer system is provided having means for inputting a viewer program which uses files to be protected and for embedding at least one challenge means in the viewer program which uses the file. The challenge means has means for participating in an asymmetric cryptographic scheme wherein the challenge means has no access to a private keying material; means for validating that the challenge means possesses the private keying material; and means for prohibiting the use of some or all the file's content unless the proof is successful.

According to a further aspect of the present invention, a method is provided of distributing files to a plurality of customers wherein each customer has a computer system as described above. Every customer receives an identical copy of the file and of the Viewer program with associated challenge means.

According to a further aspect of the present invention, a method is provided for protecting the contents of a file wherein at least one challenge means is associated with a Viewer program which uses the file. The at least one challenge means is associated with the file, and at least one response means accesses private keying material. The challenge means has no access to the private keying material. The response means proves to the challenge means that is has access to the private keying material by interacting with the challenge means using an asymmetric cryptographic scheme.

The challenge means instructs the Viewer program to avoid displaying some or all the file's content unless the proof is successful.

According to a further aspect of the present invention, it may be advantageous to use a Certificate Authority to make a public key pair available in order to make the public key pair more secure.

To further improve the security, it is an advantage that the Certificate Authority signs a Certificate Authority's private keying material and/or the file with a Certificate Authority's public keying material and sends it to a vendor's computer. The vendor's computer may validate the first public keying material and/or the file.

The asymmetric cryptographic scheme may be any proof using asymmetric cryptography such as one of the following schemes as described above:

a probabilistic proof scheme, an asymmetric confidentiality scheme, or a digital signature scheme.

To further improve the security, it is an advantage that the challenge means issues a random challenge.

To further improve the security, it is an advantage that the random challenge is generated by repeatedly timing responses to device, e.g. disk, accesses.

To further improve the security, it is an advantage that the random challenge is generated by forking new threads in such a manner as to introduce an additional degree of randomness into the random challenge by exploiting unpredictabilities in the operating system's scheduler.

To further improve the security, it is advantageous that a statistical test is performed to determine the number of random bits obtained by each of the disk accesses and causes disk accesses to be repeated until a predetermined number of random bits have been obtained.

To further improve the security, it is an advantage that the public keying material held in the keyfile is cryptographically secured whereby it is computationally infeasible to alter any portion of the keyfile including the public keying material without altering the challenge means.

To further improve the security, it is an advantage that the keyfile includes information identifying the customer to which the protected item of software has been supplied.

To further improve the security, it is advantageous that the file is marked using digital watermarking.

To further improve the security, it is advantageous that the file is encrypted.

An important technical differentiation between the present invention and the mechanism described in "*Cryptolope Container Technology,*" supra is a difference in the respective mechanisms for authenticating a customer. The present invention uses cryptographic proofs to distinguish between customers while the mechanism described in "*Cryptolope Container Technology,*" supra uses decryption technology to distinguish between customers.

As described above, the protocol in "*Cryptolope Container Technology,*" supra does not provide that the customer has the correct asymmetric private key as illustrated in the above-described attack scenario. The present invention does not suffer from this vulnerability. As a result, the present invention protects against unauthorized file redistribution while the protocol in "*Cryptolope Container Technology,*" supra does not.

A Viewer is defined as a computer program that accepts a file as input and then displays the contents of the file to a user in a meaningful way. For example, if the file contains a graphic image, then the Viewer may display the graphic image on a computer monitor. The term 'Viewer' and 'display' are used liberally. If the file contains audio information, then the Viewer sends the information to the computer system's speakers in a manner that permits the user to hear the recorded information. If the file contains a moving picture or animation, then the Viewer may display a movie or animation on a computer monitor. Some Viewers may potentially display the contents of the file by making some or all of the contents available to a printer. In some cases, one may wish to construct a Viewer so that the Viewer only passes low-quality information to the printer. In the remainder of this document, reference to the Viewer displaying a file means that the Viewer presents the information in the file in a meaningful way, e.g. audio, graphics, movies.

The present invention references two file formats, Unprotected Format (UF) and Protected Format (PF). The term Unprotected Format UF is used as a placeholder of some document format. Often, one defines an Unprotected Format UF without reference to security. An example of an Unprotected Format UF format is the Rich Text Format (RTF). Many word processors available today can store the contents of a document in the RTF format or some other proprietary Unprotected Format. Another example of an Unprotected Format UF is a digital format for storing recorded audio. Another example of an Unprotected Format UF is a digital format for storing animation or a movie. Normally, the designers of an Unprotected Format UF do not attempt to prohibit others from building a Viewer that displays or generates a UF formatted file.

The Protected Format PF has the property that the Protected Format PF only gives meaningful information to specially constructed Viewer programs. For example, if the Protected Format PF file contains music, then a user may not listen to the music unless the Protected Format PF file were given to a special Viewer program. It is exceedingly difficult to build a Viewer program without proper documentation that describes the Protected Format PF. This documentation should be a closely guarded secret. For example, a single vendor may define the Protected Format PF and then construct the associated Viewer program. The vendor never explains to other parties any information concerning the Protected Format PF.

Consider, for example, a file that contains information stored in the RTF format. Further, consider a second file that was constructed by encrypting the RTF file. The decryption key of the second file is a closely-guarded secret, and the decryption key is embedded in a special Viewer program. In this example, the RTF formatted document is in an Unprotected Format UF and the encrypted document is in a Protected Format PF. An unauthorized attacker may not construct a rogue Viewer program that understands the Protected Format PF file unless the attacker were able to discover the Protected Format PF file's decryption key. Later, some other ways are discussed in which one may construct a Protected Format PF from an Unprotected Format UF file.

Additional features and advantages of the present invention are described in, and will be apparent from, the detailed description of the presently preferred embodiments and from the drawings.

BRIEF DESCRIPTION OF THE DRAWINGS

FIG. 14 is a block diagram of an embodiment of the present invention showing an example audit trail.

DETAILED DESCRIPTION OF THE PRESENTLY PREFERRED EMBODIMENTS

One protection mechanism in accordance with the present invention will now be described by way of example with reference to the accompanying drawings.

Figure 1:
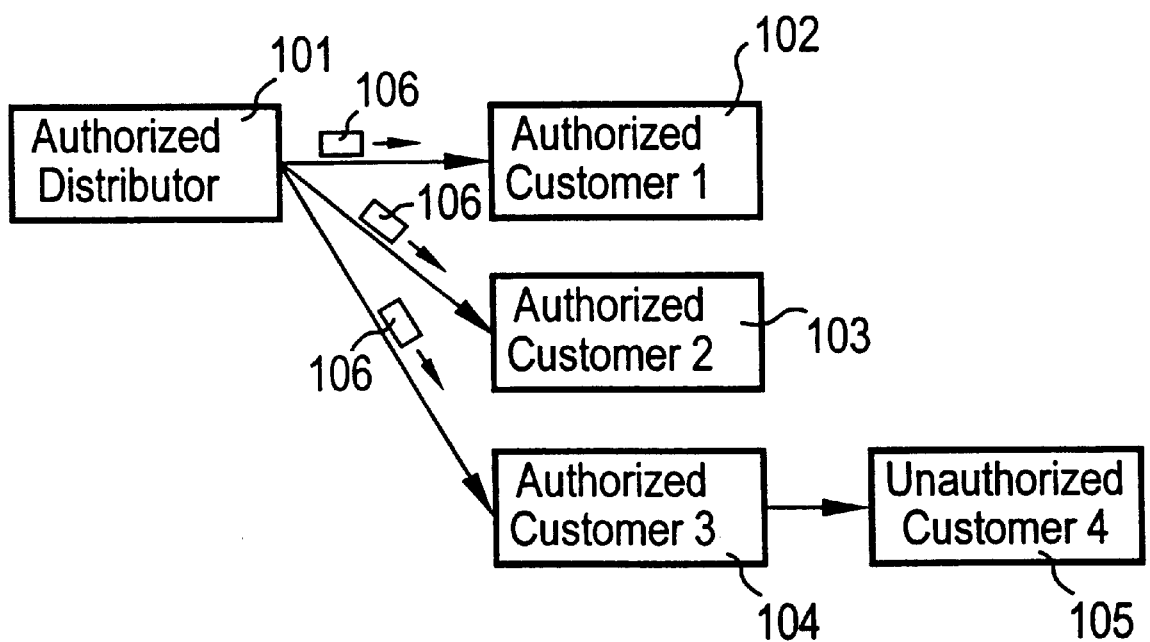
FIG. 1 is a block diagram of an embodiment of the present invention showing a distribution scenario.
Figure 2:
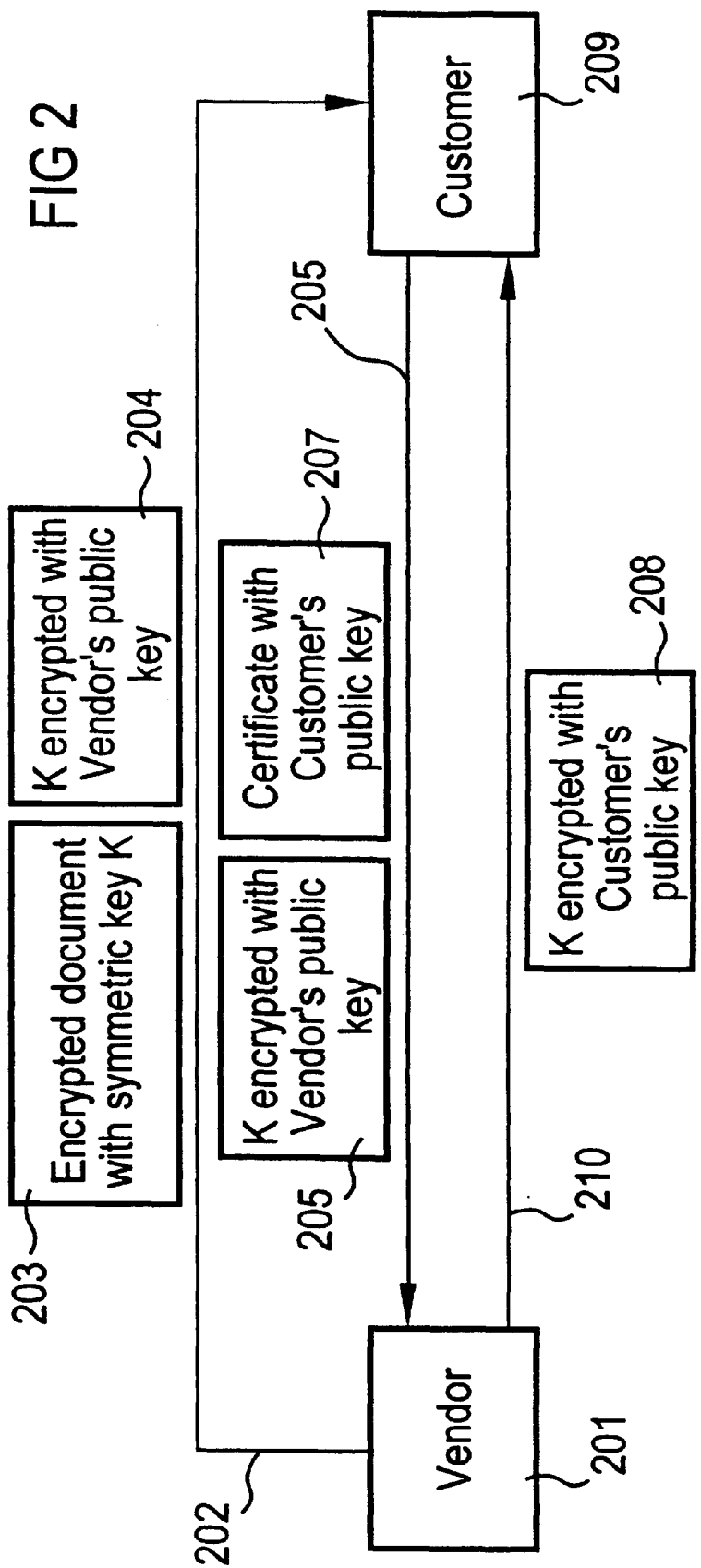
FIG. 2 is a block diagram of an embodiment of the present invention showing a detailed distribution scenario.
Figure 3:
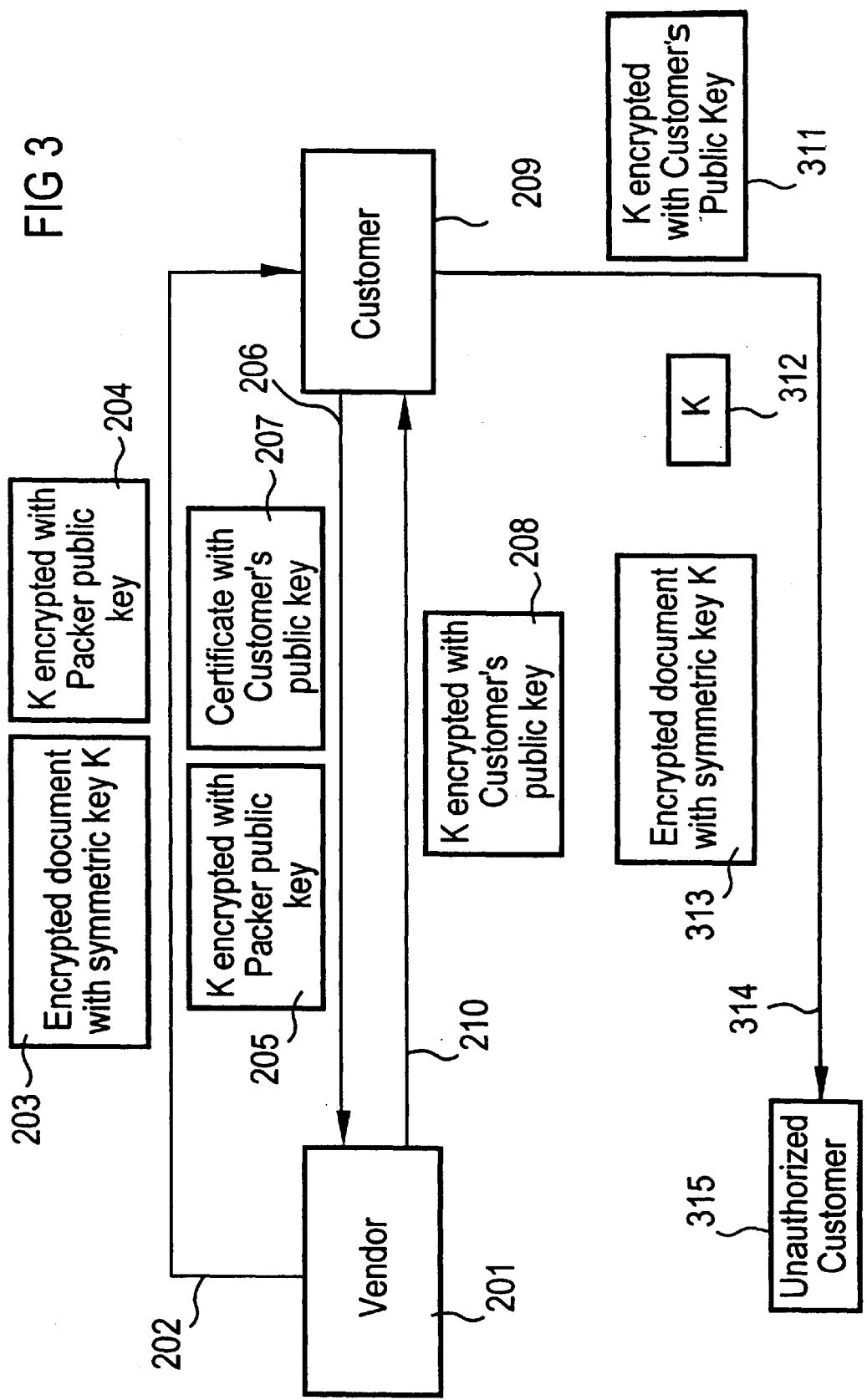
FIG. 3 is a block diagram of an embodiment of the present invention showing an attack scenario.
Figure 4:
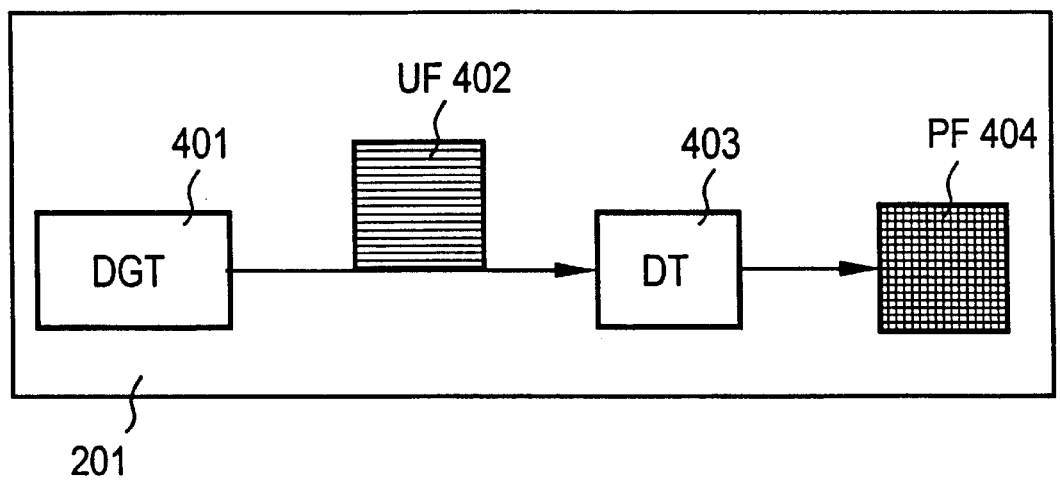
FIG. 4 is a block diagram of an embodiment of the present invention showing a document generation.

FIG. 4 shows the components used by the vendor's computer system 201 to create a protected document. The vendor first uses a Document Generating Tool (DGT) 401, e.g., a word processor, to generate a UF document 402. A Document Translator (DT) 403 accepts the UF 402 document and translates the contents of the document into a PF format 404 (PF document). The vendor should hold the UF document as a closely guarded secret.

The Document Translator 403 operates in a proprietary and secret manner. One possible way to build the Document Translator 403 is as follows:

1. Append a trailer at the end of the UF document 402. The trailer is a well-known string of characters (unique to this UF document 402) such as a copyright notice and serial number which we denote by the symbol: str.
2. Compute a message digest, muf over the UF document 402 (including the trailer), muf–h(UF)+str (h denotes the message digest function, e.g., MD5 (see R. Rivest supra)
3. Sign muf using the vendor's private keying material. This signature is denoted by smuf.
4. Build a temporary file that consists of a header which includes smuf. The remainder of the temporary file is the UF document 402 (including the trailer).

5. Generate a random number, K, to be used as an encryption key.
6. The PF document 404 is computed by encrypting the temporary file using K. A symmetric encryption algorithm such as the known Data Encryption Standard (DES) in Cipher Block Chaining Mode (CBC mode) or Triple-DES in CBC mode can be used.

Figure 5:
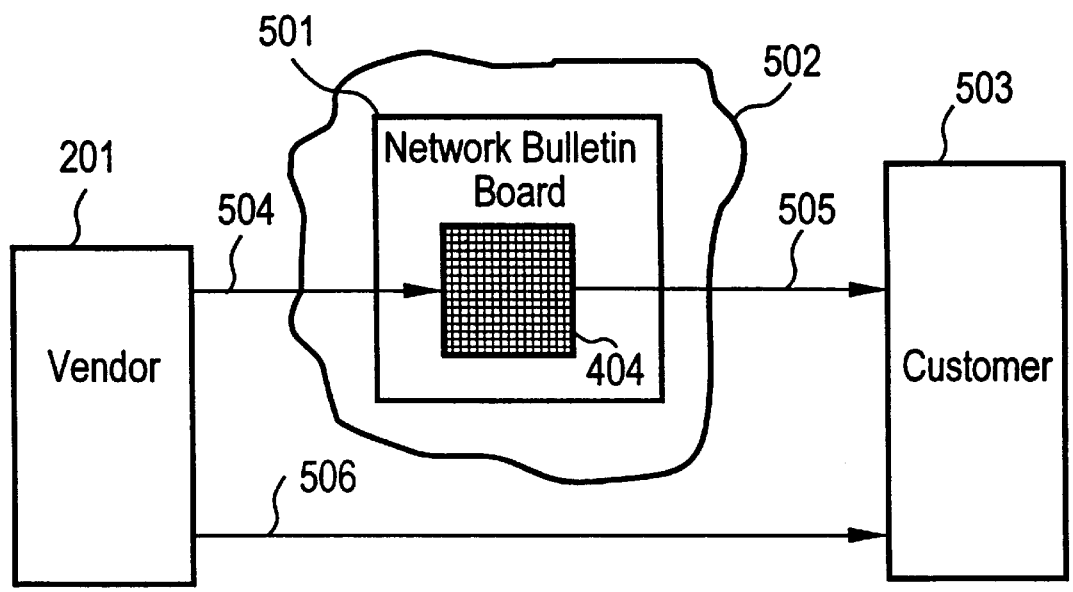
FIG. 5 is a diagram of an embodiment of the present invention of a purchasing protocol.

FIG. 5 shows a purchasing protocol used when a customer wishes to purchase a PF file 404 that is protected by a protection mechanism in accordance with the present invention.

The vendor 201 posts the PF document 404 in a network bulletin board 501 in the Internet 502 (Step 504).

A customer 503 downloads the PF file 504 from the network bulletin board 501 (Step 505).

In a further step 506, the customer 503 and the vendor 201 negotiate for a customer's authorization to display the PF file 404, i.e. to watch or read the content of the PF file 404 or listen to the content of the PF file 404. Step 506 is described in detail later.

Figure 6:
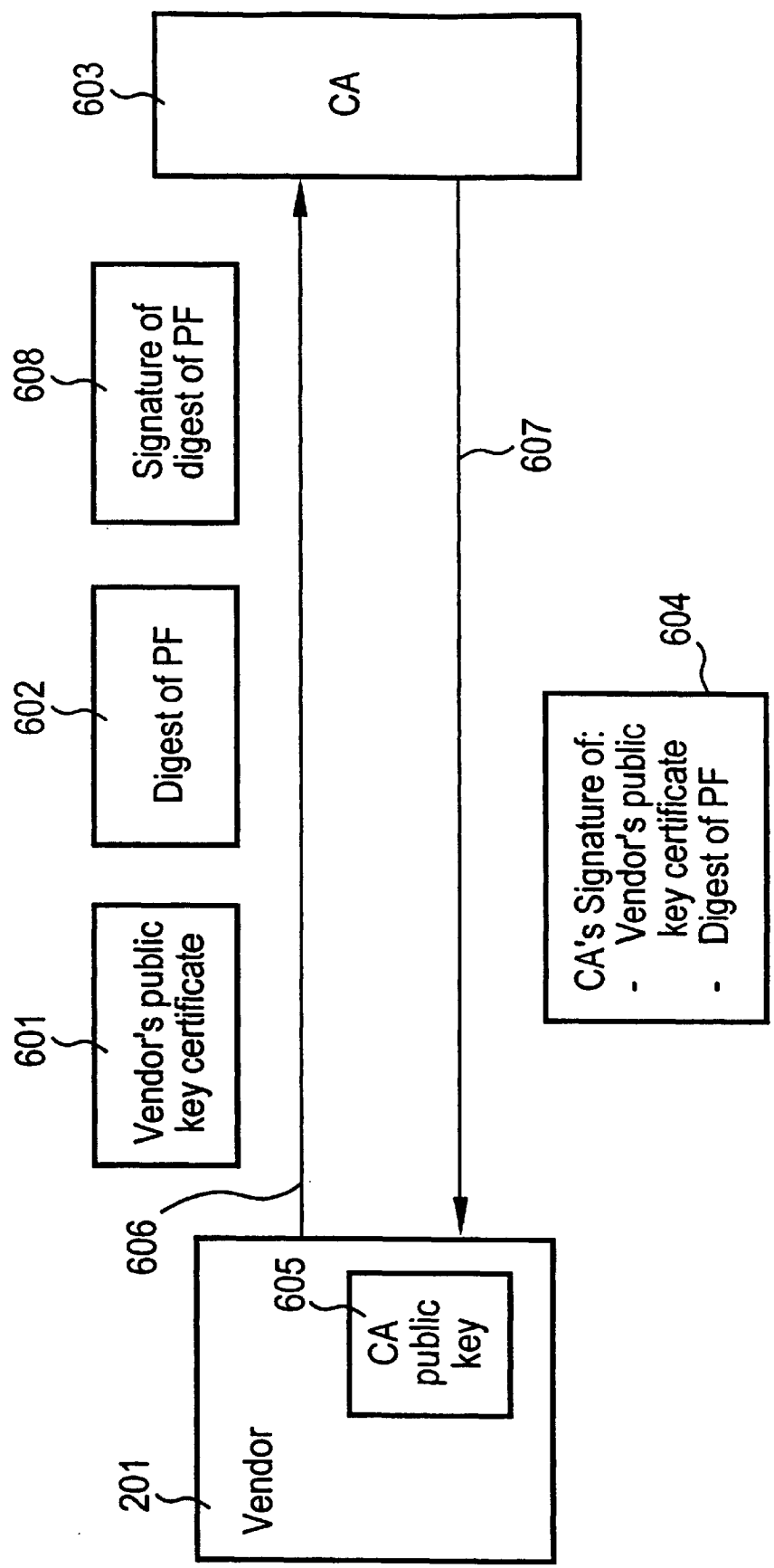
FIG. 6 is a block diagram of an embodiment of the present invention showing a certificate authority.

FIG. 6 shows a detailed scenario including a Certificate Authority 603. The purpose of the Certificate Authority 603 is to securely associate the vendor 201 with the PF files 404 that the vendor 201 generates. The order of the steps are:
1. step 606 (performed once for the document)
2. step 607 (performed once for the document)
3. step 504 (performed once for the document)
4. step 505 (performed for each customer)
5. step 506 (performed for each customer) which comprises
   a. step 702 (described below)
   b. step 704 (described below)

The vendor 201 sends a certificate that contains vendor's public keying material 601, a message digest 602 of the PF file 404, and a signature 608 of the message digest to the Certificate Authority 603 (step 606).

The message digest 602 is computed by executing a one-way has function such as MD5 (see R. Rivest supra) over a PF file 404 that the vendor wishes to distribute.

The signature 608 of the message digest is computed by the vendor by performing a digital signature operation over the message digest 602. This digital signature operation is computed using the vendor' private keying material. The vendor carefully ensures that others have no access to his private keying material.

The vendor's public key certificate 601 contains the vendor's public key. The vendor's public key certificate 601 is signed by the CA.

Figure 7:
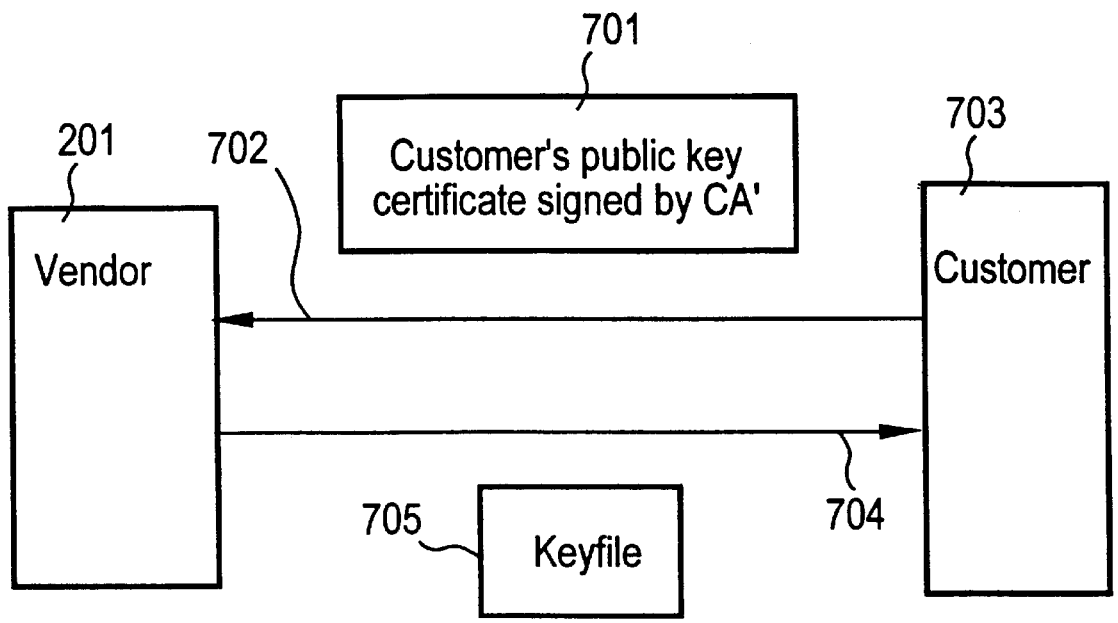
FIG. 7 is a block diagram of an embodiment of the present invention showing a scenario with a participating customer.

1. The Certificate Authority (CA) 603 validates the vendor's digital signature 608. The Certificate Authority 603 uses the vendor's public keying material extracted from the certificate 601 to perform this validation step. Additionally, the Certificate Authority 603 checks its internal database to ensure that Certificate Authority 603 has never been presented with the same message digest. If the validation and/or check fails, then the Certificate Authority 603 stops processing the vendor's request.
2. Otherwise, the Certificate Authority 603 validates the vendor's public key certificate 601. The Certificate Authority 603 performs this validation by ensuring that the certificate is signed by the Certificate Authority 603. The Certificate Authority 603 uses the CA's public keying material to perform this validation. If the validation fails, then the Certificate Authority 603 stops processing the vendor's request.
3. The Certificate Authority 603 checks its internal database to determine whether or not the Certificate Authority 603 permits the vendor 201 to publish documents. The Certificate Authority 603 does not permit unauthorized vendors to publish documents. If the vendor is not authorized, the Certificate Authority 603 stops processing the vendor's request.
4. Otherwise, the Certificate Authority 603 concatenates the certificate 601, the message digest 603, and possibly other information into a single string S. The Certificate Authority 603 computes a digital signature over the string S using the CA's private keying material. The Certificate Authority 603 is careful to ensure that the CA's private keying material is a closely guarded secret.
5. The Certificate Authority 603 sends a message back to the vendor (step 607). In this message, the CA returns the digital signature 604 computed over string S.
6. The vendor validates the CA's digital signature 604 using the CA's public keying material 605. The vendor 201 checks the vendor's internal database to ensure that the vendor 201 is using the correct Certificate Authority 603. If the vendor does not wish to continue to use the Certificate Authority 603, then the vendor stops.
1. The customer 209 sends a certificate 701 that contains the customer's 209 public keying material to the vendor 201 in step 702 (see FIG. 7). This certificate 701 is signed by a second certificate authority CA'. The second certificate authority CA' does not need to be the same as the certificate authority 603 although this is not prohibited as the second certificate authority CA' and certificate authority 603 may be the same.
2. The vendor 201 validates the signature of the customer's certificate and then extracts the customer's public keying material. If any aspects of this step fails, then the vendor 201 stops.
3. As step 702 concludes, using some authorization criteria, the vendor authorizes the customer. For example, the vendor 201 may refrain from authorizing the customer 209 until the vendor 201 receives a payment from the customer 209. If the vendor 201 does not authorize the customer 209, then the vendor 201 stops.
4. The vendor 201 creates a keyfile 705 for the customer 209. Included in the keyfile 705 is a representation of the customer's public keying material that the vendor 201 extracted from the customer's certificate, the document encryption key, K, and user access rights (described later).

The creation of the keyfile 705 is performed by a keyfile generator which is a program that executes at the vendor's facility. The vendor 201 must take care to guard this program.

In use of the keyfile generator, an operator enters the following information:

Vendor Name: Vendor name is the name of the vendor's company

Vendor Password: Vendor password is the password that unlocks the vendor company's private keying material. Company employees who do not know the password cannot generate keyfiles.

Customer Name: The customer name is the distinguished name of a customer (defined in Menezes et al. supra) for whom to generate a keyfile. The name indexes into a database of public keying material.

Keyfile Name: The keyfile name is the name of a new keyfile.

After obtaining this information, the keyfile generator builds a keyfile 705 containing the Customer Information String (CIS) described later. Portions of the keyfile 705 appear to the customer 703 as a completely random sequence of values.

Building of the keyfile 705 involves the following operations:

First, the keyfile generator creates a file and inserts the customer's public keying material into the file along with thousands of decoy bits. In the present example, each keyfile 705 contains approximately 480,000 decoy bits. This number of bits represents a significant amount of decoy material yet can fit into a standard email message.

Each keyfile 705 stores the CIS in a different location. Additionally, each keyfile 705 has encrypted customer information embedded in it without disclosing the required encryption key. This encrypted customer information permits a vendor to easily identify the owner of a keyfile 705 in the event that the keyfile 705 appears in a public location such as a bulletin board. The keyfile generator then encrypts and re-encrypts the keyfile (or portions of the keyfile) 705 multiple times, using different algorithms. Finally, the keyfile generator signs the keyfile 705 using the vendor's private keying material by applying a digital signature algorithm.

The keyfile 705 is said to be validated if the challenge means of the Viewer application (described below) can validate the vendor's signature using the public keying material stored in the challenge means' binary and access the decrypted CIS stored in the keyfile 705. Additionally, the challenge means must discover key K, decrypt the PF file 404, validate the hash and signature of the decrypted file's header using the vendor's public keying material extracted from the keyfile 705, and validate that the trailer of the decrypted document is the well-known string str.

After having created the keyfile 705, the vendor's computer 305 sends the keyfile 705 to the customer 209 by electronic mail.

The CIS is a string that contains the customer's public keying material, document encryption key K, and the Customer's access rights. The access rights provide information to the Viewer program that selectively enables functionality. For example, an access right may potentially authorize the Viewer to display a graphic picture on a monitor. A different access right may potentially permit the Viewer to play an audio file through the customer's speakers. In some cases, one may build a Viewer program with complex access rights. For example, a Viewer may potentially recognize an access right that permits a customer to view the first ten minutes of a movie. Presumably, highly trusted customers, or customers who pay more money, obtain better access rights in their keyfiles 705. Additionally, the CIS contains any other information required by the proof scheme.

The intent is that the keyfile 705 has a dual use— authorization for the Viewer to display the PF file 404 and copy protection, licensing, or rental of the Viewer program.

Once the customer 703 installs the keyfile 705, the protection mechanism permits the customer 703 to execute a Viewer program that uses the PF 404 file. The Viewer program is copy protected, licensed, and/or rented in accordance to the scenarios described below.

The Viewer only executes if permitted by the copy protection, licensing, or rental mechanism. If the Viewer program fails to validate the keyfile in any way, or if the Viewer program cannot correctly extract the CIS, then the Viewer fails to execute.

Figure 8:
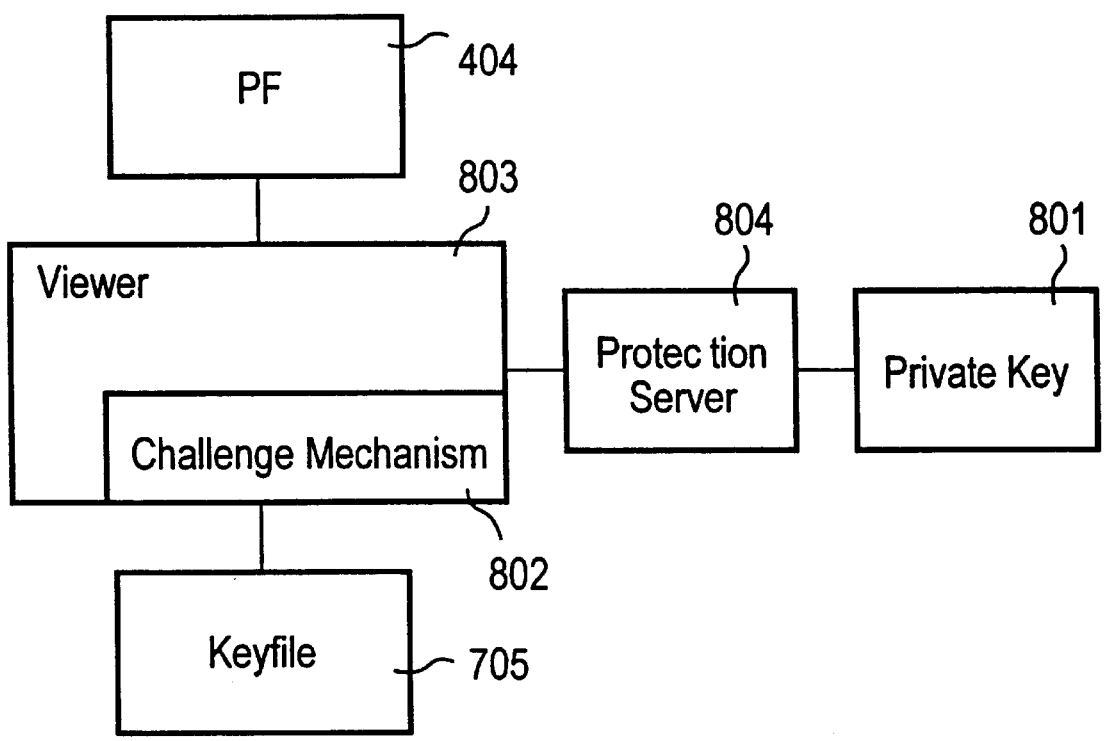
FIG. 8 is a block diagram of an embodiment of the present invention showing the software components that are required to be installed in the customer's machine to enable the customer to use the protected file.

FIG. 8 shows the software components that are required to be installed in the customer's machine, a computer, to enable the customer 209 to display the PF file 404. These consist of a protection server 804 and a Viewer 803 where the Viewer contains an embedded challenge means 802. Also shown are the keyfile 705, the private keying material of the customer 801, and the PF file 404.

The protection server 804 is a program that the customer 209 executes when the system initially boots. The customer 209 enables the system by inserting a floppy disk that contains an encrypted copy of the customer's private keying material 801. The protection server 804 then prompts the customer 209 for a pass phrase used to decrypt the floppy. The protection software does not continue executing if the customer 209 cannot supply the correct pass phrase. The protection server 804 then executes in the background waiting for requests for executing an asymmetric proof protocol, e.g. asymmetric confidentiality, probabilistic proof, or digital signature. The purpose of the asymmetric proof protocol is to prove that the protection server has access to the customer's private keying material 801.

It should be noted that the protection server 804 never releases the customer's private keying material 801 out of its process boundary. The protection server 804 relies on operating system protections to ensure its own integrity. The protection server 804 executes in its own address space and communicates with external processes.

When the Viewer's challenge mechanism executes the copy protection, software licensing, and/or software rental mechanism as described below, the challenge mechanism determines if the Viewer may continue to execute. If the copy protection, software licensing, and/or software rental protocol fails, then the Viewer stops executing or executes in a limited mode. Otherwise, the Viewer continues by performing the services described below:

1. Obtain the vendor's public keying material. If this step fails, then stop.
2. Use the vendor's public keying material to re-validate the digital signature of the keyfile. If this step fails, then stop.
3. Extract the CIS from the keyfile. If this step fails, then stop.
4. Extract the CA's public keying material that is hard-coded in the challenge mechanism. If this step fails, then stop.
5. Extract the CA's signature 704 of the vendor's public key and the message digest of the PF file 404. Validate this signature using the CA's public keying material that is hard-coded in the challenge mechanism. If this step fails, then stop.
6. Extract the access rights from the CIS.
7. Subsequently, do not permit any functionality that is not explicitly enables in one or more of the access rights extracted from the CIS.

Thus, it can be seen that the Viewer does not permit any display of the PF file that is not explicitly allowed in the author-created keyfile.

Figure 9:
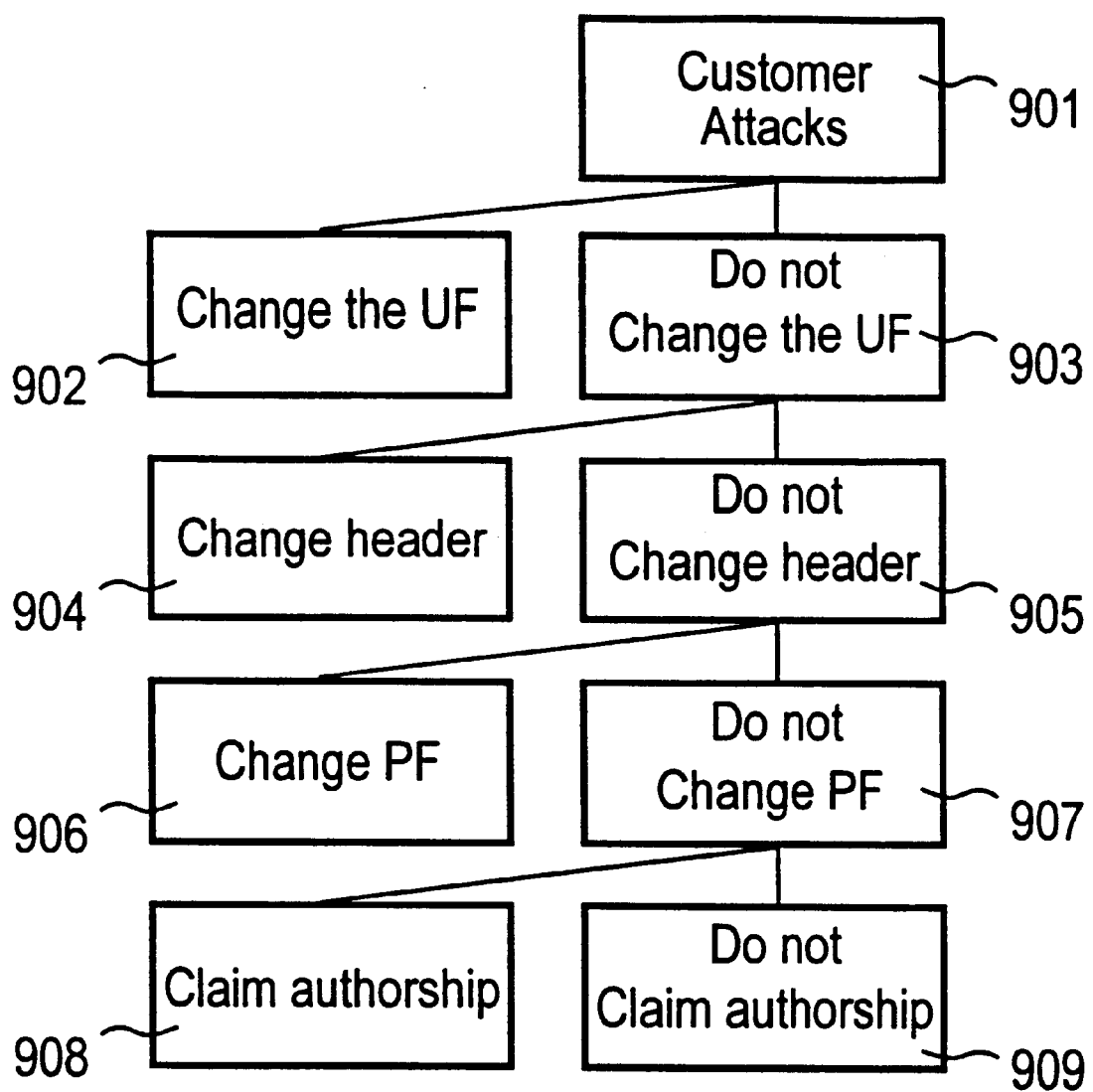
FIG. 9 is a block diagram of an embodiment of the present invention illustrating example attacks.

Furthermore, as illustrated in FIG. 9, the security mechanism prohibits a customer who is authorized to display a document from forwarding the document to unauthorized customers. FIG. 9 illustrates example attacks.

901 denotes all possible attacks.

902 denotes an attack where the customer extracts the UF file and then modifies the UF file. The customer then claims to be the vendor of the modified file. This attack is prevented because the Viewer does not release to the customer the document decryption key K (903).

904 denotes an attack where the customer does not modify the UF file; however the customer modifies the header. This attack is prevented because the customer cannot create his or her own signature because the customer does not know the document decryption key. Additionally, the customer cannot modify the existing header due to the same reason (905).

906 denotes an attack where the customer does not change the UF or the header. However, the customer changes the PF. This attack is prevented because any change to the PF without knowing the document decryption key causes the trailer validation to fail (CBC is a forward error correcting code) (907).

908 denotes an attack where the customer claims that he or she is the vendor of the original document. The CA prevents this attack by checking against multiple requests for the same PF message digest. Additionally, the Viewer eventually rejects the document because the header validation fails.

909 denotes an attack where the customer simply forwards the keyfile and the PF file to others. In this case, the others do not possess the private keying material required to validate the keyfile.

The description provided above explains how the Viewer program obtains then displays a PF file 404. The embodiments below explain how the Viewer program can be copy protected or rented.

In an embodiment using a serial number, the response means accesses both private keying material and a publicly known serial number. The challenge and response means operate as described in the embodiment using digital signature with one exception. The response means, i.e. the protection server, has a unique serial number that is publicly known but appears in no other response means. The response means is programmed such that the response means ALWAYS computes its digital signature over the input string and the unique serial number. The challenge means' validation step ensures that the response means computes the digital signature over information which includes the correct serial number. The challenge means obtains the unique serial number from the keyfile. The vendor had previously inserted the unique serial number into the keyfile after this unique serial number had been supplied by the customer.

Thus, it can be seen that the PF file cannot be viewed unless the customer possesses the proper private keying material and keyfile. Nevertheless, all customers may potentially have identical copies of the same private keying material.

In an embodiment using asymmetric confidentiality, the challenge and response means execute the asymmetric confidentiality protocol as illustrated below.

A←B: h(r), B. $P_A$(r,B)

A→B: r

The above protocol uses the following notation:

Challenge means (challenge mechanism) denoted by B (also denotes B's identity), e.g., "copy protected PF file x"

Response means (protection server) denoted by A (also denotes A's identity), e.g., "protection server version 1"

r denotes a random number used as a nonce h(r) is a message digest of the nonce $P_A$ (r,B) is encryption of the nonce and B's identity using A's public keying material.

The challenge means of the protected format document generates an unguessable nonce (random number). Next, the challenge means computes h(r) (the message digest of r). The challenge mechanism then calls an encryption function in the challenge mechanism to encrypt the nonce and challenge means' identity with the customer's public keying material. The challenge mechanism passes the message digest of the nonce h(r), challenge means' identity (B's identity), and the result of the encryption E(r) to the protection server with a request for participating in an asymmetric confidentiality proof.

When the protection server receives the request, it first decrypts the encrypted portion of the message using the customer's private keying material. Next, the protection server validates h(r) against the decrypted value. Next, the protection server validates that the challenge means' identity B appears in the message and the decrypted value correctly.

If any validation fails, the protection server returns failure without returning the decrypted nonce. However, if the validation succeeds, then the protection server returns the decrypted nonce r.

The challenge mechanism compares the received decrypted nonce with the nonce that the challenge mechanism originally encrypted. If they are not the same, the challenge mechanism hangs the protected program or otherwise disturbs normal program execution.

Thus, it can be seen that the protected format document 404 may be displayed only if the customer possesses the proper private keying material and keyfile 705.

In one embodiment using probabilistic proof, the challenge and response means execute the probabilistic proof protocol as illustrated below. (In this embodiment, the Guillou-Quisquater identification protocol is described.)

In the following protocol description, the protection server is named as party A, and the challenge mechanism is named as party B.

Calculate System Parameters:

a. Using the prime factorization, p and q, suitable for use in the computation of an RSA-like key pair compute n=p·Q and Φ=(p−1) (q−1).

b. A defines a public component u≧3 with gcd(u,Φ)=1 where gcd is the greatest Common divisor.

c. A computes a private exponent s=u$^{-1}$ (mod Φ)

d. System parameters (u,n) are made available as the public keying material.

Calculate User Parameters:

a. A selects and publishes a well known identity I and the redundant identity J=f(I) satisfying 9 <J<n using a known redundancy function f. An example of the redundancy function f is the redundancy mapping of the pre-processing stage of ISO/IEC 9796.

b. A retains as the private keying material $s_A$=J$^{-s}$ (mod n).

The GQ key pair is (private key=$s_A$) and (public key=(u, n). A makes known to B, I, f, and J=f(I). B validates that J=f(I).

The protocol messages of the GQ proof protocol are presented below:

A→B: I, x=r$^u$(mod n)  (1)

B→A: e (where 1≦e≦u)  (2)

A→B: y=r·$S_A^e$ (mod n)  (3)

A proves its identity to B by t executions of the following steps where B accepts A's identity only if all t executions are successful.

a. A selects a random secret integer r (the commitment), 1≦r≦n−1, and computes (the witness) x=r$^u$(mod n)

b. A sends to B the pair of integers (I,x)

c B selects and sends to A, a random integer e (the challenge), $1 \leq e \leq u$ d. A computes and sends to B (the response $y = r \cdot S_A^e$ (mod n).

B receives y, constructs J from I using f, computes $z = J^e \cdot y''$ (mod n) and accepts A's proof of identity if both z=x and z≠0.

If the challenge mechanism as party B does not accept A's proof of identity, then the challenge mechanism hangs the protected program, or otherwise disturbs normal program execution.

Thus, it can be seen that the protected format document 404 continues executing normally only if the customer possesses the proper private keying material and keyfile 705.

In one embodiment using the digital signature, the mechanism is as follows:

The challenge mechanism of the protected format document generates an unguessable nonce and passes the nonce to the protection server with a request for a digital signature.

When it receives the nonce, the protection server first checks that the nonce presented to it corresponds to a given format. If it does not, the protection server denies the signature request. Assuming that the nonce is in the correct format, the protection server uses a cryptographic engine to sign the nonce using the customer's private keying material. The protection server then returns the signed nonce to the challenge mechanism in the program using the protected format document.

When it receives the signed nonce, the challenge mechanism accesses the keyfile associated with the protected format document and calls a signature validation function in the challenge mechanism to validate the vendor's signature of the keyfile using the vendor's public keying material that is embedded in the challenge mechanism. As in the case of all embodiments of the present invention, this validation of the keyfile signature ensures that an attacker cannot modify the keyfile or its digital signature without additionally modifying the challenge mechanism. The vendor may optionally augment this protection using additional proprietary lines of defense. If the keyfile has been modified, the challenge mechanism hangs the program.

Assuming the signature is validated, the challenge mechanism then parses the keyfile, using a proprietary author-specific algorithm, to locate the customer's public keying material. The challenge mechanism then calls its signature validation function to validate the digital signature computed over the nonce using the customer's public keying material. If the signature is not valid, the challenge mechanism hangs or operates in a limited manner. Thus, it can be seen that the protected format document may be displayed only if the customer possesses the proper private keying material and keyfile.

Generation of a nonce is performed by a nonce generator included in the challenge mechanism. Operation of the nonce generator is as follows and reference should be made to FIG. 10.

First, the nonce generator queries a large number of system parameters, e.g. the system time, the amount of space remaining free in the page table, the number of logical disk drives, the names of the files in the operating system's directory, etc.

Figure 10:
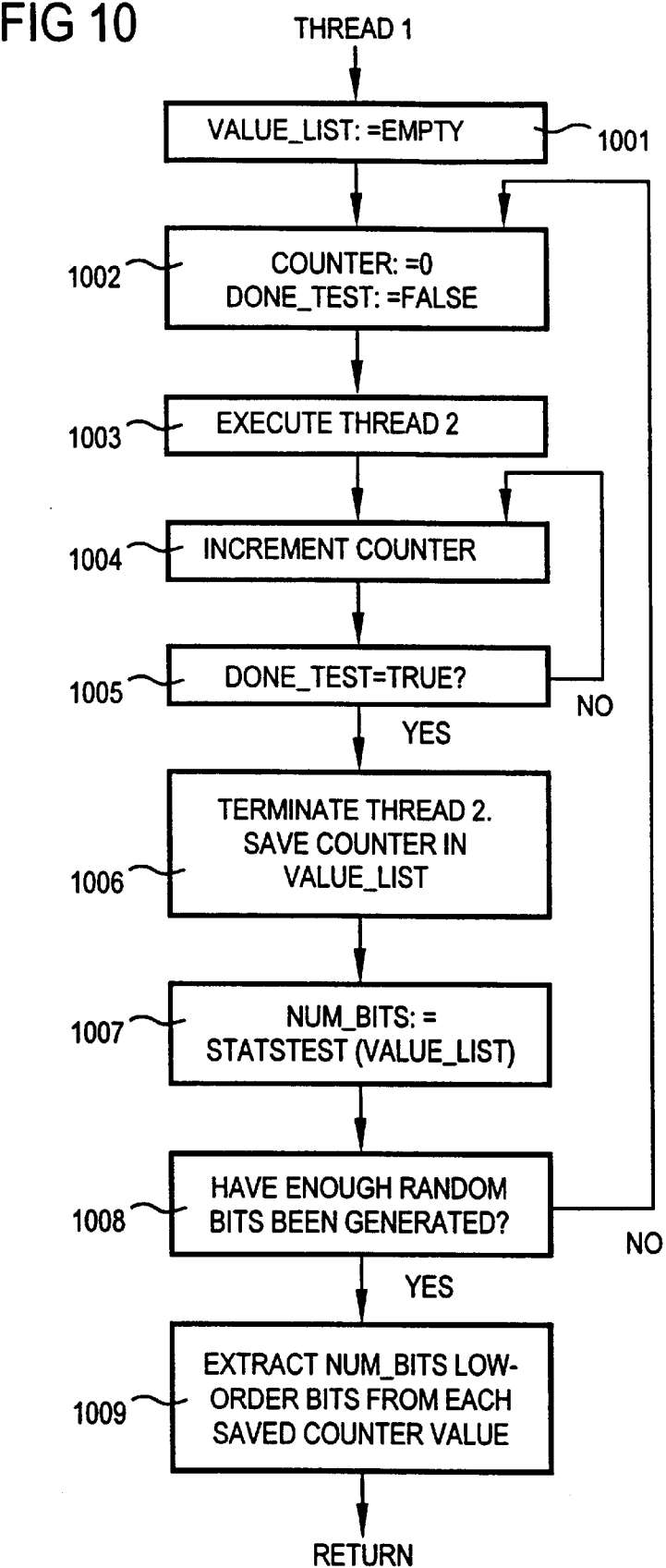
FIG. 10 is a flow chart of an embodiment of the present invention showing the operation of a random number generator used to generate nonces.

Next, the nonce generator builds a random number using a random number generator. The random number generator consists of two process threads referred to herein as Thread 1 and Thread 2. FIG. 10 shows the operation of Thread 1 which is the main thread of the random number generator.

(Box 1001) Thread 1 first creates a data structure value__list for holding a list of counter values. The list is initially empty.

(Box 1002) Thread 1 sets a current counter value to zero and sets a done test_flag to FALSE.

(Box 1003) Thread 1 then forks Thread 2. Thread 2 posts an asynchronous disk access, and then sleeps until the disk access is complete. When the disk access is complete, Thread 2 sets the done_test flag to TRUE. Note that Thread 1 and Thread 2 share the done_test flag.

(Box 1004) Thread 1 increments the counter value by one.

(Box 1005) Thread 1 then tests whether the done_test flag is now TRUE, indicating that the disk access initiated by Thread 2 is complete. If the done_test flag is FALSE, the thread returns to box 54. Thus it can be seen that, while waiting for the disk access to complete, Thread 1 continually increments the counter value.

(Box 1006) When the done_test flag is TRUE, Thread 1 terminates Thread 2, and saves the counter value in the first free location in value_list.

(Box 1007) Thread 1 then calls a Statstest function which estimates the degree of randomness of the counter values (or portions of counter values, e.g., low-order bits) saved in value_list. This function may use the Chi-Square Test, the Kolmogorov Smirnov Test, or the Serial Correlation Test, which are described in D. Knuth supra. The Statstest function may be optimized to ensure that complicated calculations are not repeated for each disk access. The Statstest function returns a value which indicates how many low-order bits of each saved counter value should be considered random.

(Box 1008) Thread 1 compares the value returned by the Statstest function when combined with the length of the value_list with a predetermined threshold value to determine whether enough random bits have now been generated. If not enough random bits have been generated, the process returns to Box 1002 to generate and save another counter value.

(Box 1009) When the required number of random bits has been generated, Thread 1 extracts the specified number of low-order bits from each counter value in the value_list and returns this sequence of bits as the output random number.

In summary, it can be seen that the random number generator exploits the unpredictability in the timing of a series of disk accesses as a source of randomness in the generator of nonces (see P. Fenstermacher al., supra) By forking new threads on each disk access, the random number generator also exploits unpredictabilities in the operation of the operating system's scheduler as a second source of randomness.

The analysis performed by the Statstest function permits the random number generator to self-tune for any speed processor and disk by computing the number of low-order bits of each saved counter value to return. For example, a system with a high-variance disk access time generates more random bits per disk access than a system with a low-variance disk access time. For example, for a Quantum 1080s disk (6 ms average write time), and a 486 66 MHZ processor, the system generates approximately 45 bits per second. Alternatively, one may hard code the number of bits per disk access and use a de-skewing technique to ensure a good degree of randomness.

The nonce generator also queries the operating system to ensure that it posts each disk access to an actual disk. The final output nonce is formed by combining the output random number from the random number generator with the result of querying the system parameters as described above using a message digest.

The nonce generator described above works best when executing on an operating system that provides direct access to the disk, e.g., Windows 95 or Windows NT 4.0. In such an operating system, special operating system calls available to programs executing in user space permit a program to bypass the operating system's internal buffering mechanism and write directly to the disk. Most programs do not take advantage of these special operating system calls because they may be relatively inefficient and difficult to use. On Windows 95 and Windows NT, a program may only use these special calls if the program accesses data that is a multiple of the disk's sector size by querying the operating system.

If the operating system does not provide direct access to the disk, then the challenge mechanism 24 may still use the disk timing random number generator. However, in this case, the quality of the generated values may have a greater reliance upon unpredictabilities in the operating system's scheduler as opposed to the variance inherent to the disk access time.

The example of the present invention described above assumes that the operating system permits a program to fork multiple threads within a single address space. Additionally, the example of the present invention assumes that the operating system permits the threads to access synchronization variables such as semaphores. Most modern operating systems provide these services. The example of the present invention uses multiple threads to implement a mechanism which quantifies each disk access time. However, if an implementation of the present invention were to execute on a system that does not provide multiple threads or synchronization variables, then the nonce generator may substitute other mechanisms, e.g. querying a physical clock.

Figure 11:
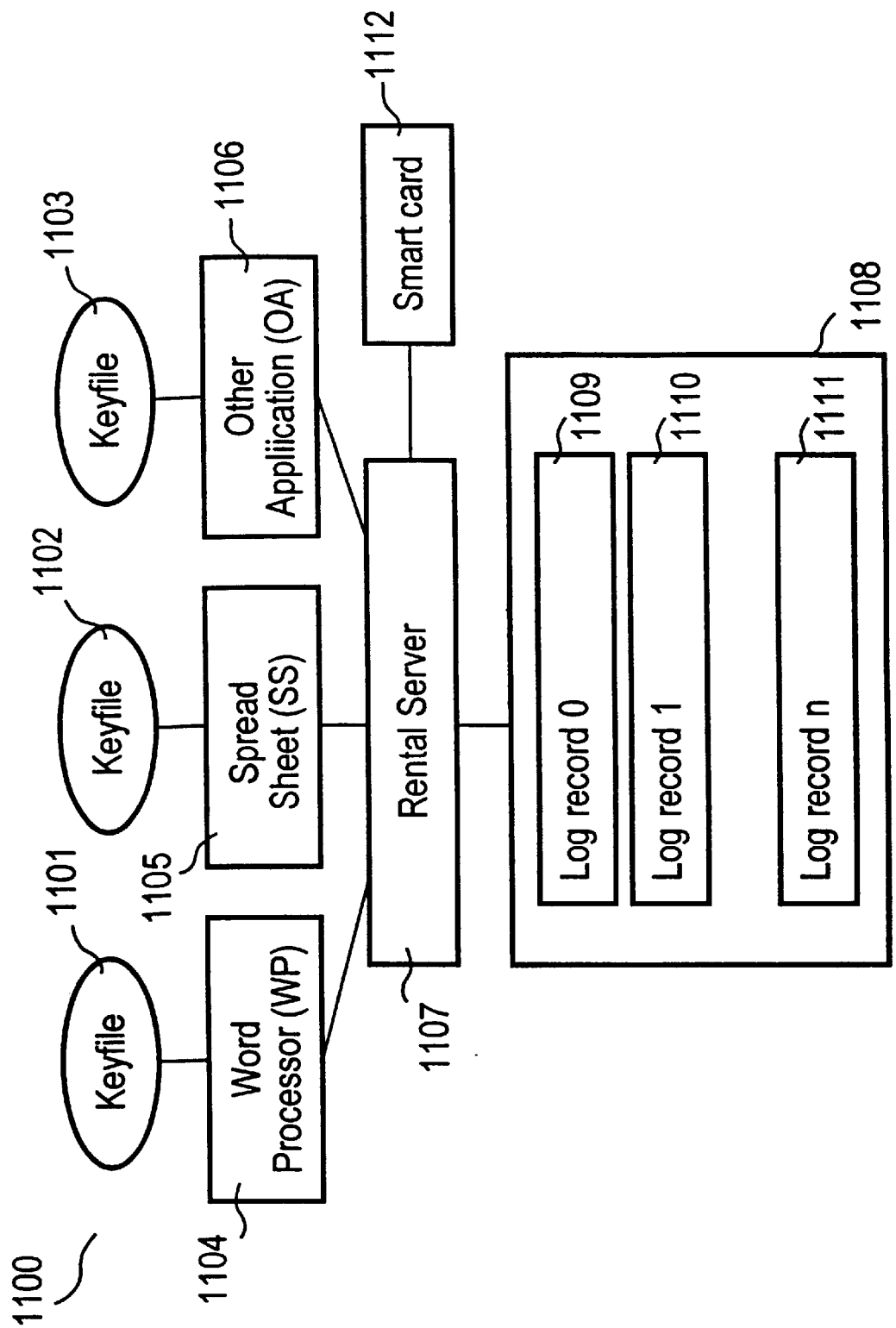
FIG. 11 is a block diagram of an embodiment of the present invention showing the architecture of the software rental system.

FIG. 11 illustrates the system's 1100 architecture. Potentially multiple applications (programs) of software reside on the system where each application has its own keyfile. FIG. 11 illustrates three applications: a word processor 1104, a spread sheet 1105, and another application 1106 which access keyfiles 1101, 1102 and 1103, respectively. In some cases, multiple applications 1104, 1105, 1106 may share a common keyfile.

Each of the applications 1104, 1105, 1106 accesses its keyfile 1101, 1102 and 1103 to extract the customer's public keying material from the CIS.

Each application vendor inserts rental instructions into a copy protected program. These rental instructions create log records, e.g., records 1109, 1110, 1111. For example, every fifteen minutes the word processor 1104 executes, the word processor 1104 creates the following log record: "Word Process WP with public key 9828a8c12a5873654bac684517d3afe3 executed for 15 minutes" (note that the record may store the message digest of the public keying material rather than the public keying material itself). Next, the application sends its log record to a rental server 1107. The rental server 1107 inserts the log record at the end of a secure audit trail 1108 stored at a potentially unsecured storage location, e.g., a file on a disk. The rental server 107 relies on the assistance of a smart card 1112 for security.

An application, e.g. the application 1104, 1105, or 1106, may choose to create a log record that contains any arbitrary string of bits with arbitrary length. In addition, or in lieu of recording time, an application may potentially log the number of times that the application or some of its modules executes. For example, SS 105 may potentially append a single log record each time SS boots: "Application SS with public key 768230aac8239d9df88cfe3c7b832a is executing". Different types of audit records, e.g. time of usage or number of times that usage occurred, may appear in the same audit trail. Multiple rented applications may simultaneously use the same audit trail.

Figure 12:
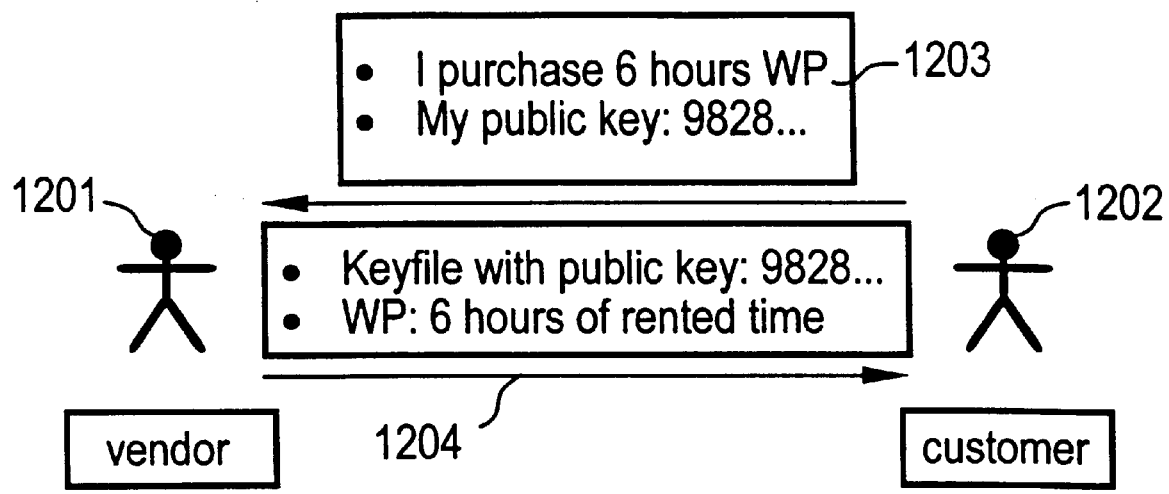
FIG. 12 is a block diagram of an embodiment of the present invention showing a rental software purchase scenario.

One obtains software rental by matching thresholds against the audit trail. FIG. 12 illustrates a customer 209 who rents software from a vendor 201. First, the customer 209 sends a request to rent the software to the vendor 201 in an order request 1203. In this example, the customer purchases six hours of the application 1104. After receiving payment, the vendor 201 sends to the customer 209 the keyfile 1101 that contains a usage authorization. In this case, the keyfile 1101 permits six hours of execution by the application 1104. The later described keyfile 1101 may potentially contain other information, e.g. copy protection or licensing information.

Periodically, the rented application, e.g., the word processor (application) 1104 examines the audit trail 1108. If the audit trail 1108 is not valid, then the word processor 1104 does not permit itself to be rented. However, if the audit trail 1108 is valid, then the application 1104 analyzes the audit trail 1108 and compares the analysis against the keyfile 1101. For example, the application 1104 counts the number of log records that describe fifteen minute intervals. Next, the application 1104 looks into the keyfile 1101 to locate a rental threshold which, in this present example, is six hours (24×15 minute intervals). If the application 1104 locates fewer than twenty-four of its log records denoting fifteen minute intervals, then the application 1104 continues executing. Otherwise, the application 1104 does not permit itself to be rented. In the latter case, the customer must purchase a new keyfile in order to continue renting the application 1104. If the application 1104 were to exceed its rental threshold, e.g. the spread sheet 1105 and the other application 1106 would not be effected. That is, each rented application views its own records from the audit trail without interpreting records created by other applications.

From the discussion above, the architecture implements software rental provided that the rented applications, e.g. the applications 1104, 1105, 1106, can unequivocally validate the audit trail 1108. The following properties should be satisfied:

1. Holes: A rented application, e.g. the word processor 1104, in this present example, validates that the audit trail contains all of the records that have ever been written regardless of application. If an application has previously written ten log records, then the rented application, e.g. the word processor 1104, cannot validate the audit trail 1108 if the rented application may not locate all ten log records. An absence of holes is required because an attacker should not be permitted to delete individual log records in order to destroy a record of usage.

2. Modification: An application, e.g. the word processor 1104, must unequivocally conclude that no unauthorized attacker modified any of SP's log records. Otherwise, for example, the attacker may modify all of the fifteen minute log records to fifteen second log records to dramatically increase the amount of time that the software may execute.

3. Current: A rented application must be able to validate that the audit trail 1108 is current. Otherwise, the audit trail 1108 may potentially be old, thus hiding relatively new audit records 1109, 1110, 1111. One may not wish, for example, an attacker to perform the backup and restore attack.

These three properties remove all incentive for an attacker to corrupt, delete, lose or otherwise abuse the audit trail 1108. If the attacker were to render the audit trail 1108 invalid, then all of the rented applications 1104, 1105, 1106 may identify the abuse and subsequently refuse rental.

Figure 13:
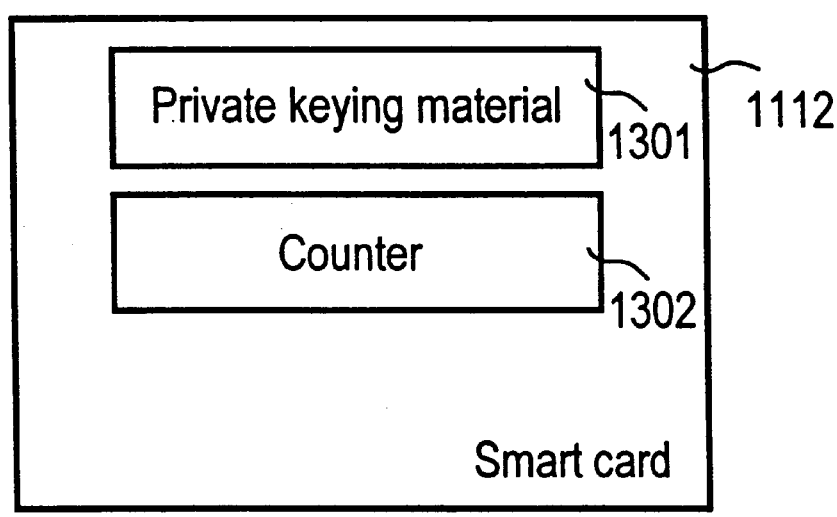
FIG. 13 is a block diagram of an embodiment of the present invention showing the smart card architecture.

In order to provide security, the architecture requires a smart card 1112 that performs asymmetric cryptography. In this present example, the smart card 1112 execute digital signatures. The smart card 1112 contains private keying material 1301 and a counter 1302 as shown in FIG. 13.

When the customer obtains the smart card 1112, the smart card 1112 is in a secure state. The smart card provides exactly two services that access either the private keying material or the counter:
SignAndIncremento and GetCounter() described in pseudo program code hereinafter (note that the symbol // denotes a comment, and ← denotes the assignment operator)

Signature SignAndIncrement (HASH h) // h is a message digest
    BEGIN
        [1] Compute the message digest of h and the smart card's counter, i.e., h'←hash(h,counter)
        [2] Sign h' with the private keying material
        [3] Increment the smart card's counter by 1
        [4] return the digital signature computed in step [2]
    END
    integer GetCounter()
    BEGIN
        [1] return the current value of the smart card's counter
    END Consider the following example trace. Suppose that the smart card's counter has an initial value of six and that one executes the following operations:
    (i) Signature1←SignAndIncrement (hash ("m1"))
    (ii) Signature 2←SignAndIncrement (hash ("m2"))
    (iii) intl←GetCounter ()
The results of this example are:
    Signature1 gets the digital signature (using the smart card's private keying material) of hash(hash ("m1"),6)
    Signature2 gets the digital signature (using the smart card's private keying material) of hash(hash ("m2"),7)
    intl gets 8

The audit trail 1108 contains a list of records where each record has four fields: nonce, string, counter, and signature. The data input into the signature is hash(hash(nonce,string), counter). FIG. 14 illustrates an example audit trail with four records. In the first record, the nonce has the value 96, the string is "WP 15 minutes public key 9828a8c12a5873654bac684517d3afe3" (where 9828a8c12a5873654bac684517d3afe3 denotes the message digest of a real public key), the counter's value is 0, and the digital signature is of hash(hash(96, "WP 15 minutes public key 9828a8c12a5873654bac684517d3afe3"),0). Here the digital signature is provided using private keying material which corresponds to public keying material 9828a8c12a5873654bac684517d3afe3. This public keying material may be extracted from WP's keyfile.

The counter never rolls over from its highest value to zero. When the counter reaches its highest value, e.g., $2^{128}-1$ the system stops.

A rented application appends a record to the audit trail by executing the Write routine where the Write routine is embedded within the rented applications. This routine generates an audit record and then sends the audit record to the rental server 1107. The rental server 1107 writes the audit record into a non-volatile, stable image of the audit trail, e.g. on one or more files. The rental server 1107 synchronizes access to the smart card 1112 and the audit trail. The rental server 1107 cannot execute in a manner that thwarts system security, i.e. the rented applications do not trust the rental server 1107. If the rental server 1107 were to act incorrectly, then there may potentially be a denial of service because it may be the case that the rented applications may not validate the audit trail.

The Write routine is provided below in pseudo program code:

Boolean Write(String str)
    BEGIN
        [1] n←generate a new nonce
        [2] h1←hash (n,str)
        [3] s←SignAndIncrement(h1)
        // below, c is a local copy of value in the smart card
        [4] c←Get Counter ()
        // below, decrement by 1 has no affect on smart card
        [5] decrement c by 1
        [6] h2←hash(h1,c)
        [7] validate that s is the signature of h2 against the public key found in the keyfile (if the validation fails, then return failure immediately without executing any further steps).
        [8] create the rental record r←<n,str,c,s>
        [9] append r to the audit trail
        [10] return TRUE if all of the preceding steps succeed, otherwise return failure
    END The ValidateTrail routine is also embedded in the rented application and should be executed periodically and is provided below in pseudo program code (assume that the system started with an initial counter value of zero):

Boolean ValidateTrail ()
    BEGIN
        [1] c←GetCounter()
        [2] Write(c) // use the Write routine above, exit if // failure
        [3] r←Last record in the audit trail // this is the record that was just written in step [2]
        [4] Validate the signature stored in r against the public key stored in the keyfile
        [5] Validate that c is the same as the counter stored in r
        [6] FOR i←0 UNTIL there are no more records, INCREMENT i by 1
            [6.1] r←$i^{th}$ record from the audit trail
            [6.2] Validate the signature stored in r against the public key stored in the keyfile
            [6.3] Validate that is the same as the counter stored in r
        [7] END FOR LOOP
        [8] if all of the above steps succeed, then return TRUE, otherwise return FALSE
    END In steps [4] and [6.2] above, all of the input for the validation is from the audit record itself. By carefully analyzing all of the steps in the Write and ValidateTrail routines, it is clear that any attack that thwarts the intended use of these routines causes failure. In this case, the rented applications notice the failure and do not permit themselves to be rented.

The mechanism for recovering from a failure depends upon the vendor for each particular rented application. The vendor may, for example, issue a new keyfile upon some customers' requests. Perhaps, the most significant issue is recovery from accidental loss of the audit trail that may occur due to a disk error. To protect against this situation, the rental server 1107 should be responsible for writing all records to the audit trail on behalf of all rented applications. The rental server 1107 should maintain a primary audit trail on the local fixed disk and at least one backup audit trail on a separate medium, e.g. a floppy or a network file server. One may, for example, provide a service that permits the rental server 1107 to e-mail audit trails to a secured network backup service. In this case, one can ensure privacy by permitting the rental server 1107 to encrypt the audit trail before transmission.

In an alternative embodiment of the present invention, the customer's public keying material held in the keyfile may be cryptographically secured. In this case, it is computationally infeasible to alter any portion of the keyfile, including the customer's public keying material, without altering the challenge means. That is, the keyfile is signed with the vendor's private keying material, and the vendor's public keying material is coded in the challenge means. Furthermore, the keyfile may include information identifying the customer to which the protected PF file has been supplied. Rather than in the Internet, or in general in a communication network, the PF file(s) may also be stored on a different medium, e.g. the CD-ROM.

Furthermore, the translator can mark the UF file using digital watermarking (fingerprinting). Different types of watermarking are described in J. Brasil et al., *"Electronic Marking and Identification Techniques to Discourage Document Copying,"* IEEE INFOCOM 94, pp. 1278–1287, e.g. using slightly different spacing between letters or modified fonts or unusual line spacing. The Viewer does not accept a PF unless the Viewer can first obtain the UF file and then locate and validate the watermark. This watermark is a secret.

After extracting the UF file from the PF file, the Viewer may insert a watermark that is unique to the customer. In this way, if the customer were to make an unauthorized copy of the document, then the unauthorized copy contains a watermark that uniquely identifies the customer. While the present invention prevents simple constructions of unauthorized electronic copies, the customer may potentially use a camera to take pictures of a display and then distribute copies of these pictures.

The keyfile may contain more than one CIS pieces which, when combined, form a single CIS. As a result, the vendor need not concatenate all of the customer information, e.g. customer's public key and access rights, into a single contiguous string.

The CA and the vendor may either reside in a single administrative domain or different administrative domains. In the first case, the vendor can distribute documents with the continual assistance of a third party CA. In the latter case, the third party CA provides extra security assurances. In the case of a third party CA, all vendors should be required to sign a legally binding agreement prohibiting the use of the CA for the purposes of committing fraud.

The translator can encrypt the UF twice when creating the PF file. Each encryption uses a different symmetric key K and K'. The vendor places key K in the CIS. The vendor encrypts key K' using the customer's public keying material and then places the encrypted result in the keyfile. The Viewer cannot decrypt to discover key K' unless the customer has the correct private keying material.

No attacker can discover key K unless the attacker defeats the security mechanism that protect the keyfile.

Since the customer's private keying material is securely stored in a smart card or protection server, the Viewer cannot obtain access to the private keying material.

Thus, the Viewer must present the encrypted key K' to the smart card or protection server for decryption. The customer may potentially listen to the result of the decryption and obtain key K'. Nevertheless, by using two keys, this mechanism increases the overall security of the system.

Before encrypting, computing message digests, and computing signatures, the translator may modify the UF file in a manner that hides special semantics of the UF file. For example, if standard Viewers for the UF file exist, then the translator may insert non-standard commands that break all of the security mechanisms of the present invention and obtain the UF file, then the attacker may not easily use any standard Viewer to display the UF file.

Any or all private keying material described in the present invention may be stored securely on a smart card. The smart card has the property that the smart card performs asymmetric cryptographic operations using the private keying material. The smart card never releases the private keying material out of the smart card's perimeter in an unencrypted form. Thus, it can be seen that a smart card does not disclose the private keying material.

In order to improve performance of the rental embodiment, one may augment the system with a trusted audit trail validation service. Here, the trusted service periodically validates an audit trail and then appends a new audit record, the validator record, that securely vouches for the previous records. Example information that the validator record may contain is a digital signature of the message digest (hash) of all preceding audit records in the audit trail (the digital signature uses the private key of the audit validation service). Henceforth, rented applications need not validate digital signatures of records that precede the validator record. The audit trail validation service may be implemented by a third party that is accessible via a network or e-mail connection.

In the ValidateTrail procedure's steps [5] and [6.3], it is possible that the counter value of the initial record is not zero. In this case, the counter value starts at offset, and steps [5] and [6.3] must take offset into account in the comparison.

Note that the vendor of the rented application trusts the smart card to avoid releasing the private keying material. Additionally, the vendor of the rented application trusts that the smart card uses its private keying material in no functions other than SignAndIncrement and GetCounter. The vendor of the rented application may wish to validate the smart card manufacturer and/or personalizer.

A vendor may create and distribute an application after a customer obtains a smart card. In this case, the vendor simply creates a software rental keyfile for the customer and sends the keyfile to the customer (possibly after receiving payment).

In a variant to the example mechanism, all customers rent the software using the same public/private key pair. Here, the vendor trusts that the smart card operates correctly and never releases the value of the private keying material outside of the smart card. As in the case of FIG. 13, the smart card contains both private keying material 1301 and a counter 1302. Additionally, the smart card contains a unique serial number where no two smart cards have the same serial number. Step [1] of the SignAndIncrement routine implemented on the smart card differs from the one described above as follows:

[1] Compute the message digest of h and the serial number and the smart card's counter, i.e. h'←hash(h, serial_number,counter)

In addition to the SignAndIncrement and the GetCounter routines, the smart card additionally provides the GetSerialNumber routine:

string GetSerialNumber()
BEGIN
    [1] return the smart card's serial number
END In the step depicted by 1203, the customer additionally sends his or her smart card's serial number. The keyfile 705 contains the following information:

The universal public keying material shared by all customers

The unique serial number of the customer's smart card

The hash records stored in the log file take into account the serial number. For example, the first hash record of FIG. 14 has the following information for a message signature:

Signature of hash(hash(96,WP . . . ), serial_number,0)

The Write routine step [6] has the following modification:

[6] h2←hash(h1,serial_number,c)

The ValidateTrail routine's steps [4] and [6.2] must use the serial number (otherwise they would always fail). The vehicle is not specified that the Write and ValidateTrail routines use to obtain the serial number of the local smart card. One may, for example, query the smart card a single Lime and then store the serial number in a file in the local file system.

A software vendor may potentially provide a rented application with a complex threshold calculation. For example, the vendor may rent blocks of 1000 units. For each hour that the software executes between 20.00 (8:00 PM) and 06.00 (6:00 AM) the next morning, the log record defines one unit, and for each hour in a different portion of the day, the log record defines two units. So, for example, a customer may potentially use the software for 1000 nighttime hours, 500 daytime hours, or some calculated combination of nighttime and daytime hours.

Note that, as described in the present invention, the vendor authorizes a customer to view a file by giving the customer a keyfile with the customer's public keying material.

Additionally, the vendor may authorize a distributor to:

1. authorize distribution and/or
2. authorize others to be distributors by giving to the distributor the vendor's private keying material.

The vendor may additionally authorize at least a second distributor to:

1. authorize distribution, but not
2. authorize others to distribute by using the following technique.

The vendor signs a certificate that comprises the second distributor's public keying material. The second distributor signs keyfiles with the second distributor's private keying material (in lieu of vendor's signature of keyfiles). In the challenge means' keyfile validation step, the challenge means validates the second distributor's certificate using the vendor's public keying material embedded in the challenge means. The challenge means subsequently uses the second distributor's public keying material to validate keyfiles.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A computer system, comprising:
    a protection mechanism for protecting contents of a file wherein the protection mechanism has
        at least one viewer program,
        at least one challenge means associate with said viewer program and said file, and
        a response means with private keying material that the response means can access,
        wherein the at least one challenge means has no access to the private keying material, and
        further wherein the response means has
            means for proving that the response means has access to the private keying material by interacting with the at least one challenge means using an asymmetric cryptographic scheme as a proof,
        still further wherein the at least one challenge means has
            means for prohibiting use of some or all of said file's content unless said proof is successful,
    a distribution system having access to said private keying material of a vendor in said distribution system, said distribution system being authorized to distribute said file wherein said distribution system prohibits said further distribution system from making other distribution systems having access to said private keying material of said vendor,
    wherein said further distribution system signs said keyfile using a private keying material of said further distribution system,
    said at least one challenge means validates a certificate of said further distribution system signed using said private keying material of said vendor, said certificate including a public keying material of said further distribution system and using a public keying material of said vendor, and
    said at least one challenge means validates said keyfile using said public keying material of said further distribution system.

2. A computer system, comprising:
    a protection mechanism for protecting the contents of a file, the protection mechanism including
        at least one viewer program,
        at least one challenge means associated with said viewer program and said file, and
        a response means with private keying material that the response means can access,
        wherein the at least one challenge means has no access to the private keying material, and
        further wherein the response means has
            means for proving that the response means has access to the private keying material by interacting with the at least one challenge means using an asymmetric cryptographic scheme as a proof,
        still further wherein the at least one challenge means has
            means for instructing the viewer program to avoid displaying some or all of said file's content unless said proof is successful,
    a distribution system having access to said private keying material of a vendor in said distribution system, wherein said distribution system is authorized to distribute said file wherein said distribution system prohibits said further distribution system from making other distribution systems having access to said private keying material of said vendor,
    wherein said further distribution system signs said keyfile using a private keying material of said further distribution system,
    said at least one challenge means validates a certificate of said further distribution system signed using said private keying material of said vendor, said certificate including a public keying material of said further distribution system and using a public keying material of said vendor, and said at least one challenge means validates said keyfile using said public keying material of said further distribution system.

3. A computer system, comprising:

means for inputting a viewer program which uses a file to be protected and for embedding at least one challenge means in the viewer program which uses said file,
  wherein said at least one challenge means includes
    means for participating in an asymmetric cryptographic scheme,
  wherein the at least one challenge means has no access to a private keying material, and
  means for validating that the response means possesses said private keying material as a proof, and
  further wherein the at least one challenge means has means for prohibiting use of some or all of said file's content unless said proof is successful, a distribution system having access to said private keying material of a vendor in said distribution system, wherein said distribution system is authorized to distribute said file wherein said distribution system prohibits said further distribution system from making other distribution systems having access to said private keying material of said vendor, wherein said further distribution system signs said keyfile using a private keying material of said further distribution system, said at least one challenge means validates a certificate of said further distribution system signed using said private keying material of said vendor, said certificate including a public keying material of said further distribution system and using a public keying material of said vendor, and said at least one challenge means validates said keyfile using said public keying material of said further distribution system.

4. A computer system, comprising:

means for inputting a viewer program which uses a file to be protected and for embedding at least one challenge means in the viewer program which uses said file,
  wherein said at least one challenge means has
    means for participating in an asymmetric cryptographic scheme,
    wherein the at least one challenge means has no access to a private keying material,
    means for validating that the response means possesses said private keying material as a proof,
    means for instructing the viewer program to avoid displaying some or all of said file's content unless said proof is successful, a distribution system having access to said private keying material of a vendor in said distribution system, wherein said distribution system is authorized to distribute said file wherein said distribution system prohibits said further distribution system from making other distribution systems having access to said private keying material of said vendor, wherein said further distribution system signs said keyfile using a private keying material of said further distribution system, said at least one challenge means validates a certificate of said further distribution system signed using said private keying material of said vendor, said certificate including a public keying material of said further distribution system and using a public keying material of said vendor, and said at least one challenge means validates said keyfile using said public keying material of said further distribution system.

5. The computer system according to one of claims 1, 2, 3 or 4, further comprising:
  means for prohibiting a customer from printing some or all of said file unless said proof by said means for validating succeeds.

6. The computer system according to one of claim 1, 2, 3 or 4, further comprising:
  a certificate authority for making available a public key pair.

7. The computer system according to claim 6, wherein said certificate authority signs at least one of a public keying material and said file with a certificate authority's private keying material, said certificate authority sends said at least one of said public keying material and said file to a vendor's computer,
  wherein said vendor's computer validates said at least one of said public keying material and said file.

8. The computer system according to one of claim 1, 2, 3 or 4, wherein said asymmetric cryptographic scheme is one of a probabilistic proof scheme and an asymmetric confidentiality scheme and a digital signature scheme.

9. The compute system according to one of claim 1, 2, 3 or 4, wherein said probabilistic proof scheme is one of a zero knowledge proof scheme and a witness hiding proof scheme.

10. The computer system according to one of claim 1, 2, 3 or 4, further comprising:
  means for issuing a random challenge associated with said at least one challenge means.

11. The computer system according to claim 10, wherein said means for issuing a random challenge includes means for generating a random challenge by repeatedly timing response to device accesses.

12. The computer system according to claim 11, wherein said means for generating a random challenge includes means for forking new threads in such a manner as to introduce an additional degree of randomness into said random challenge by exploiting unpredictabilities in an operating system's scheduler.

13. The computer system according to claim 11, wherein said means for generating a random challenge includes
  means for performing a statistical test to determine a number of random bits obtained by each of disk accesses, and
  means for causing disk accesses to be repeated until a predetermined number of random bits has been obtained.

14. The computer system according to one of claim 1,2, 3 or 4, wherein said at least one challenge means is embedded in said viewer program.

15. The computer system according to one of claim 1, 2, 3 or 4, further comprising:
  a keyfile for holding at least one of public keying material and document handling rules.

16. The computer system according to claim 15, wherein contents of the keyfile are physically stored in at least one file.

17. The computer system according to claim 16, wherein the public keying material held in said keyfile is cryptographically secure, wherein the public keying material is computationally infeasible to alter any portion of the keyfile including the public keying material without altering the at least one challenge means.

18. The computer system according to claim 15, wherein said keyfile includes information identifying a customer to which the file which has been protected has been supplied.

19. The computer system according to claim 15, wherein said keyfile includes decoy bits for disguising the public keying material held in said keyfile.

20. The computer system according to claim 15, wherein said keyfile includes information concerning selective activation of services of the file.

21. The computer system according to one of claim 1, 2, 3 or 4, wherein said file is accessible one of a communication network and CD-ROM.

22. The computer system according to one of claim 1, 2, 3 or 4, wherein said file is marked using digital watermarking.

23. The computer system according to one of claim 1, 2, 3 or 4, wherein said file is encrypted.

24. The computer system according to claim 1, 2, 3 or 4, wherein said distribution system makes at least one further distribution system having access to said private keying material of said vendor, wherein said further distribution system is authorized to distribute said file.

25. A method for protecting contents of a file, wherein at least one challenge means is associated with a viewer program which uses said file, the at least one challenge means is associated with said file, and at least one response means accesses private keying material, the method comprising the steps of:

preventing access of the at least one challenge means to the private keying material;

proving to the at least one challenge means by the at least one response means that the at least one response means has access to the private keying material by interacting with the at least one challenge means using an asymmetric cryptographic scheme as a proof;

instructing the viewer program by the at least one challenge means to avoid displaying some or all of said file's content unless said proof is successfull;

providing a distribution system having access to a private keying material of a vendor, and said distribution system being authorized to distribute said file, wherein said distribution system makes at least one further distribution system having access to said vendor's private keying material and further wherein said further distribution system is authorized to distribute said file, wherein said distribution system prohibits said further distribution system from making other distribution systems having access to said vendor's private keying material, wherein said further distribution system signs said keyfile using a further distribution system's private keying material, said at least one challenge means validates a further distribution system's certificate signed using said vendor's private keying material and using said certificate including a further distribution system's public keying material and using a vendor's public keying material, and said at least one challenge means validates said keyfile using said further distribution system's public keying material.

* * * * *